United States Patent
Choc et al.

(10) Patent No.: US 8,959,450 B2
(45) Date of Patent: Feb. 17, 2015

(54) PATH EXPLORER VISUALIZATION

(75) Inventors: Theodore Nicholas Choc, Palo Alto, CA (US); Sissie Ling-Ie Hsiao, Santa Clara, CA (US); Leo Baghdassarian, Mountain View, CA (US)

(73) Assignee: Google Inc., Mountain View, CA (US)

( * ) Notice: Subject to any disclaimer, the term of this patent is extended or adjusted under 35 U.S.C. 154(b) by 531 days.

(21) Appl. No.: 13/215,150

(22) Filed: Aug. 22, 2011

(65) Prior Publication Data

US 2013/0055137 A1 Feb. 28, 2013

(51) Int. Cl.
*G06Q 30/02* (2012.01)

(52) U.S. Cl.
CPC .................................. *G06Q 30/02* (2013.01)
USPC ..... 715/772; 705/14.4; 705/14.41; 705/14.45

(58) Field of Classification Search
CPC   G06Q 30/02; G06Q 30/0242; G06Q 30/0246
USPC .................... 715/772; 705/14.4, 14.41, 14.45
See application file for complete search history.

(56) References Cited

U.S. PATENT DOCUMENTS

| | | | |
|---|---|---|---|
| 6,148,333 A | 11/2000 | Guedalia et al. | |
| 6,282,532 B1 | 8/2001 | Sandell | |
| 6,701,318 B2 | 3/2004 | Fox et al. | |
| 6,839,680 B1 | 1/2005 | Liu et al. | |
| 6,996,536 B1 | 2/2006 | Cofino et al. | |
| 7,363,302 B2 | 4/2008 | Lester | |
| 7,523,191 B1 | 4/2009 | Thomas et al. | |
| 7,668,726 B2 | 2/2010 | Cardno et al. | |
| 7,917,382 B2 | 3/2011 | Cereghini et al. | |
| 8,259,722 B1 | 9/2012 | Kharitonov | |
| 2001/0014868 A1 | 8/2001 | Herz et al. | |
| 2003/0018584 A1 | 1/2003 | Cohen et al. | |
| 2003/0025696 A1 | 2/2003 | Mulgan | |
| 2004/0043764 A1 | 3/2004 | Bigham et al. | |
| 2004/0085362 A1 | 5/2004 | Sauermann et al. | |
| 2005/0021397 A1 | 1/2005 | Cui et al. | |
| 2005/0071218 A1 | 3/2005 | Lin et al. | |
| 2005/0131762 A1 | 6/2005 | Bharat et al. | |
| 2005/0182676 A1 | 8/2005 | Chan | |
| 2005/0273388 A1 * | 12/2005 | Roetter ........................... | 705/14 |
| 2006/0132507 A1 | 6/2006 | Wang | |
| 2006/0149728 A1 | 7/2006 | Error et al. | |

(Continued)

FOREIGN PATENT DOCUMENTS

JP   2005-196675   7/2005
KR   10532621 B1   6/2003

(Continued)

OTHER PUBLICATIONS

US Office Action on 13/13/084,413 dtd May 3, 2013.

(Continued)

*Primary Examiner* — Alvin Tan
*Assistant Examiner* — Ashley Fortino
(74) *Attorney, Agent, or Firm* — John D. Lanza; Foley & Lardner LLP

(57) ABSTRACT

A system and method that allows for dynamic conversion path exploration. Users can explore all their conversion paths and narrow events they want to investigate by prepending or appending events to the analysis view. In addition, users segment the neighboring events by one of the event dimensions (e.g., source, medium, campaign, keyword).

25 Claims, 17 Drawing Sheets

(56) References Cited

U.S. PATENT DOCUMENTS

| | | | |
|---|---|---|---|
| 2006/0212350 A1 | 9/2006 | Ellis et al. | |
| 2006/0216683 A1 | 9/2006 | Goradia | |
| 2006/0218035 A1 | 9/2006 | Park et al. | |
| 2006/0277211 A1 | 12/2006 | Error | |
| 2007/0027754 A1 | 2/2007 | Collins et al. | |
| 2007/0027768 A1 | 2/2007 | Collins et al. | |
| 2007/0044133 A1 | 2/2007 | Hodecker | |
| 2007/0156514 A1 | 7/2007 | Wright et al. | |
| 2007/0156621 A1 | 7/2007 | Wright et al. | |
| 2007/0156887 A1 | 7/2007 | Wright et al. | |
| 2007/0233571 A1 | 10/2007 | Eldering et al. | |
| 2007/0282684 A1 | 12/2007 | Prosser et al. | |
| 2008/0046218 A1 | 2/2008 | Dontcheva et al. | |
| 2008/0071767 A1* | 3/2008 | Grieselhuber et al. | 707/5 |
| 2008/0114639 A1 | 5/2008 | Meek et al. | |
| 2008/0162699 A1 | 7/2008 | Gaffney | |
| 2008/0172271 A1 | 7/2008 | Wee et al. | |
| 2008/0183745 A1* | 7/2008 | Cancel et al. | 707/102 |
| 2008/0184116 A1* | 7/2008 | Error | 715/704 |
| 2008/0215633 A1 | 9/2008 | Dunkeld et al. | |
| 2008/0221987 A1 | 9/2008 | Sundaresan et al. | |
| 2009/0043648 A1 | 2/2009 | Mahdian et al. | |
| 2009/0076886 A1 | 3/2009 | Dulitz et al. | |
| 2009/0106081 A1 | 4/2009 | Burgess et al. | |
| 2009/0187922 A1 | 7/2009 | Molotsi | |
| 2009/0192888 A1 | 7/2009 | Barton et al. | |
| 2009/0292677 A1 | 11/2009 | Kim | |
| 2010/0088373 A1 | 4/2010 | Pinkham | |
| 2010/0094704 A1 | 4/2010 | Subramanian et al. | |
| 2010/0198680 A1 | 8/2010 | Ma et al. | |
| 2010/0250336 A1 | 9/2010 | Selinger et al. | |
| 2010/0306276 A1 | 12/2010 | Davis et al. | |
| 2011/0082858 A1 | 4/2011 | Yu et al. | |
| 2011/0191343 A1 | 8/2011 | Heaton et al. | |
| 2011/0231239 A1 | 9/2011 | Burt et al. | |
| 2011/0302025 A1 | 12/2011 | Hsiao et al. | |
| 2011/0307515 A1 | 12/2011 | Chen et al. | |
| 2012/0159637 A1 | 6/2012 | Dove et al. | |
| 2012/0303447 A1 | 11/2012 | Hughes et al. | |
| 2013/0304565 A1 | 11/2013 | Saccoman | |

FOREIGN PATENT DOCUMENTS

| | | |
|---|---|---|
| KR | 10200727759 | 3/2007 |
| KR | 10200756047 | 5/2007 |
| KR | 1020070111647 | 11/2007 |
| KR | 10200889616 | 10/2008 |
| KR | 102008103605 | 11/2008 |
| KR | 20080114804 A | 12/2008 |
| KR | 102008114804 | 12/2008 |
| KR | 1020093377 | 1/2009 |
| KR | 2009-0090032 | 8/2009 |
| KR | 100928198000 | 11/2009 |
| KR | 20100101707 A | 9/2010 |
| KR | 102010101707 | 9/2010 |
| WO | WO-2006/004800 A2 | 1/2006 |

OTHER PUBLICATIONS

US Notice of Allowance on U.S. Appl. No. 13/084,413 dtd May 15, 2013.
International Search Report and Written Opinion for PCT/US2011/053952, DTD May 30, 2012, 9 pages.
International Search Report and Written Opinion for PCT/US2011/054000, DTD Apr. 19, 2012, 9 pages.
International Search Report and Written Opinion for PCT/US2011/053837, dated Sep. 26, 2012, 9 pages.
International Search Report and Written Opinion for PCT/US2011/053838, dated Feb. 27, 2012, 11 pages.
International Search Report and Written Opinion for PCT/US2011/053934, dated Aug. 29, 2012, 9 pages.
International Search Report and Written Opinion for PCT/US2011/053973, dated May 14, 2012, 9 pages.
International Search Report and Written Opinion for PCT/US2011/054000, dated Apr. 19, 2012, 9 pages.
International Search Report and Written Opinion for PCT/US2011/054007, dated Aug. 28, 2012, 8 pages.
International Search Report and Written Opinion for PCT/US2011/054065, dated Apr. 19, 2012, 8 pages.
US Office Action for Application No. 13/084,413 dated Aug. 9, 2012, 14 pages.
US Office Action for U.S. Appl. No. 13/084,530 dated Aug. 13, 2012, 21 pages.
US Office Action for U.S. Appl. No. 13/084,537 dated Aug. 14, 2012, 34 pages.
Google Inc., "Enterprise-Class Features Delivered on Google's World-Class Platform," Google Analytics, Nov. 8, 2011, pp. 1-5, http://www.google.com/intl/en_uk/analytics/features.html.
Google Inc., "Enterprise-Class Web Analytics Made Smarter, Friendlier and Free." Google Analytics, Nov. 8, 2011, pp. 1-2, http://2600.wrepp.com/2600/Links/27/2/www.google.com/analytics/.
Google Inc., Web Analytics TV #22-the Automation Episode, Google Analytics, Nov. 7, 2011, 1 page, http://analytics.blogspot.com/2011/11/web-analytics-tv-22-automation-episode.html.
Google Inc., "Design Updates to the New Interface Coming Next Week," Google Analytics, Sep. 28, 2011, 1 page, http://analytics.blogspot.com/2011/09/design-updates-to-new-interface-coming.html.
Google Inc., "Webmaster Tools in Google Analytics for Everyone," Google Analytics, Oct. 4, 2011, pp. 1-6, http://analytics.blogspot.com/2011/10/webmaster-tools-in-google-analytics-for.html.
Google Inc., "What's Happening on Your Site Right Now?," Google Analytics, Sep. 29, 2011, 1 page, http://analytics.blogspot.com/2011/09/whats-happening-on-your-site-right-now.html.
US Office Action on U.S. Appl. No. 13/192,814, dated May 3, 2013, 43 pages.
US Notice of Allowance on U.S. Appl. No. 13/184,772, dated Jul. 15, 2013, 24 pages.
US Office Action on U.S. Appl. No. 13/192,814 dated Oct. 15, 2013, 11 pages.
US Office Action on U.S. Appl. No. 13/206,402 DTD Feb. 5, 2014, 10 pages.
US Notice of Allowance on U.S. Appl. No. 13/192,814 DTD Feb. 24, 2014, 8 pages.
International Search Report and Written Opinion for PCT/US2011/054069, mail date May 16, 2012, 17 pages.
US Notice of Allowance on U.S. Appl. No. 13/084,546 DTD Apr. 8, 2013.
US Notice of Allowance on U.S. Appl. No. 13/084,413 DTD Apr. 8, 2013.
US Office Action on U.S. Appl. No. 13/084,413 DTD Jan. 10, 2013.
US Office Action on U.S. Appl. No. 13/206,402 DTD Apr. 25, 2013.
US Office Action on U.S. Appl. No. 13/084,530 DTD Apr. 5, 2013.
US Office Action on U.S. Appl. No. 13/184,772 DTD Jan. 29, 2013.
US Office Action on U.S. Appl. No. 13/084,530 DTD Mar. 5, 2013.
US Office Action on U.S. Appl. No. 13/084,537 DTD Mar. 8, 2013.
US Office Action on U.S. Appl. No. 13/084,546 DTD Jan. 10, 2013.
EPO: Notice from the European Patent Office dated Oct. 1, 2007 concerning business methods, Official Journal of the European Patent Office, vol. 30, No. 11, Nov. 1, 2007, pp. 592-593.
Extended European Search Report on EP 11863322.1, dated Jul. 25, 2014, 9 pages.
Extended European Search Report on EP 11863359.3 DTD Jul. 23, 2014, 7 pages.
US Office Action on U.S. Appl. No. 13/084,530 DTD Apr. 18, 2014, 14 pages.
US Office Action on U.S. Appl. No. 13/084,537 DTD Apr. 29, 2014, 24 pages.
US Office Action on U.S. Appl. No. 13/084,549, DTD Aug. 8, 2014, 12 pages.
Extended European Search Report on EP Application No. 11 863 627.3, dtd Aug. 27, 2014, 6 pages.
Extended European Search Report on EP Application No. 11863350.2, dated Oct. 1, 2014, 11 pages.

(56) References Cited

OTHER PUBLICATIONS

CN Office Action mailed Oct. 28, 2014 in Application No. 2011800715742, 10 pages. [English translation].
Extended European Search Report on EP Application No. 11863325.4, mailed Nov. 5, 2014, 9 pages.

US Office Action on U.S. Appl. No. 13/192,814 DTD Sep. 30, 2014, 12 pages.

US Office Action on U.S. Appl. No. 13/084,537 DTD Nov. 19, 2014, 22 pages.

* cited by examiner

PATH EXPLORER VISUALIZATION

BACKGROUND

The Internet provides access to a wide variety of content. For instance, images, audio, video, and web pages for a myriad of different topics are accessible through the Internet. The accessible content provides an opportunity to place advertisements. Advertisements can be placed within content, such as a web page, image or video, or the content can trigger the display of one or more advertisements, such as presenting an advertisement in an advertisement slot.

Advertisers decide which ads are displayed within particular content using various advertising management tools. These tools also allow an advertiser to track the performance of various ads or ad campaigns. The parameters used to determine when to display a particular ad can also be changed using advertising management tools.

The data that is used to generate the performance measures for the advertiser generally includes all data that is available. This data usually includes a combination of data from multiple servers. The amount of the combined data is large enough that performance measures generated from the data can be used to provide an efficient way of understanding the data. Processing of the data to generate useful and accurate performance measures involves a number of obstacles. For instance, if a performance measure is based upon a user's actions over a period of time, the user's actions should be tracked. The user's action may be tracked using a variety of implementations, such as but not limited to, a cookie, server log files, profiles or other suitable ways of tracking the user interaction. A cookie can be used to track a user's actions over a period of time. However, if this cookie is removed during the period of time, collection of accurate data tracking the user's actions may be disrupted. The data can contain recorded user actions and an advertiser can specify which of these actions should be considered a conversion. The conversions can be any recordable events that meet an advertiser's predetermined criteria. Identifying other actions that contribute to the occurrence of conversions is valuable. The data, however, contains numerous actions that could be associated with conversions. In addition, the data may also contain information regarding user actions that do not contribute to any recorded conversions. Thus, processing the data to provide accurate and reliable performance measures based upon as much information as possible regarding user actions has a number of challenges. For example, a user can visit 10 pages, put two things in their cart, and finally complete a purchase. The data could potentially contain all of this information (and more), but an advertiser may choose to consider a purchase as a conversion. Other advertisers may say that adding to the cart is a type of conversion, as is the purchase themselves. Additionally or alternatively other advertisers may say that staying on a page for 30 seconds or longer is a type of a conversion.

SUMMARY

An embodiments of a method for providing data related to conversion paths includes receiving information regarding a first plurality of conversion paths, such that each conversion path includes one or more user interactions. The embodiment includes a user interaction with a plurality of dimensional data that are related to the user interaction. Each conversion path may corresponds to a single user or computer. Each conversion path ends with a conversion interaction. The method may include determining a second plurality of conversion paths from the first plurality of conversion paths such that the second plurality of conversion paths represent those of the first plurality of conversion paths which include a first user interaction with first dimensional data. Additionally or alternatively, the method includes generating one or more groups of user interactions preceding the first user interaction based on a second dimensional data. Additionally or alternatively, the method includes generating one or more groups of user interactions following the first user interaction based on a third dimensional data. The method includes providing data associated with the one or more groups of user interactions preceding the first user interaction and data associated with the one or more groups of user interactions following the first dimensional data.

Embodiment of at least one non-transitory computer readable storage medium encoded with processor-executable instructions that, when executed by at least one processor, perform a method for providing data related to conversion paths, the method including receiving information regarding a first plurality of conversion paths, such that each conversion path comprises one or more user interactions. Each user interaction including a plurality of dimensional data that are related to the user interaction. Each conversion path corresponds to a single user, and each conversion path ends with a conversion interaction. The method includes determining from the first plurality of conversion paths a second plurality of conversion paths including a first user interaction with first dimensional data. The method includes generating one or more groups of user interactions preceding the first user interaction based on a second dimensional data. The method includes generating one or more groups of user interactions following the first user interaction based on a third dimensional data. The method includes providing data associated with the one or more groups of user interactions preceding the first user interaction and data associated with the one or more groups of user interactions following the first dimensional data.

An apparatus for providing data related to conversion paths, the apparatus including, at least one communications interface, at least one memory to store processor-executable instructions; and at least one processor communicatively coupled to the at least one communications interface and the at least one memory. Upon execution of the processor-executable instructions, the at least one processor receives information regarding a first plurality of conversion paths, such that each conversion path comprises one or more user interactions, a user interaction comprises a plurality of dimensional data that are related to the user interaction, wherein each conversion path corresponds to a single user, and each conversion path ends with a conversion interaction. The at least one processor may determine a second plurality of conversion paths based on which of the first plurality of conversion paths include a first user interaction having a predetermined dimensional data. The at least one processor may generate one or more groups of user interactions preceding the first user interaction based on a second dimensional data. The at least one processor generates one or more groups of user interactions following the first user interaction based on a third dimensional data. In other embodiments, a second processor may perform at least some of the steps discussed above.

BRIEF DESCRIPTION OF THE DRAWINGS

Various embodiments taught herein are illustrated by way of example, and not by way of limitation, in the figures of the accompanying drawings, in which.

Figure 1:
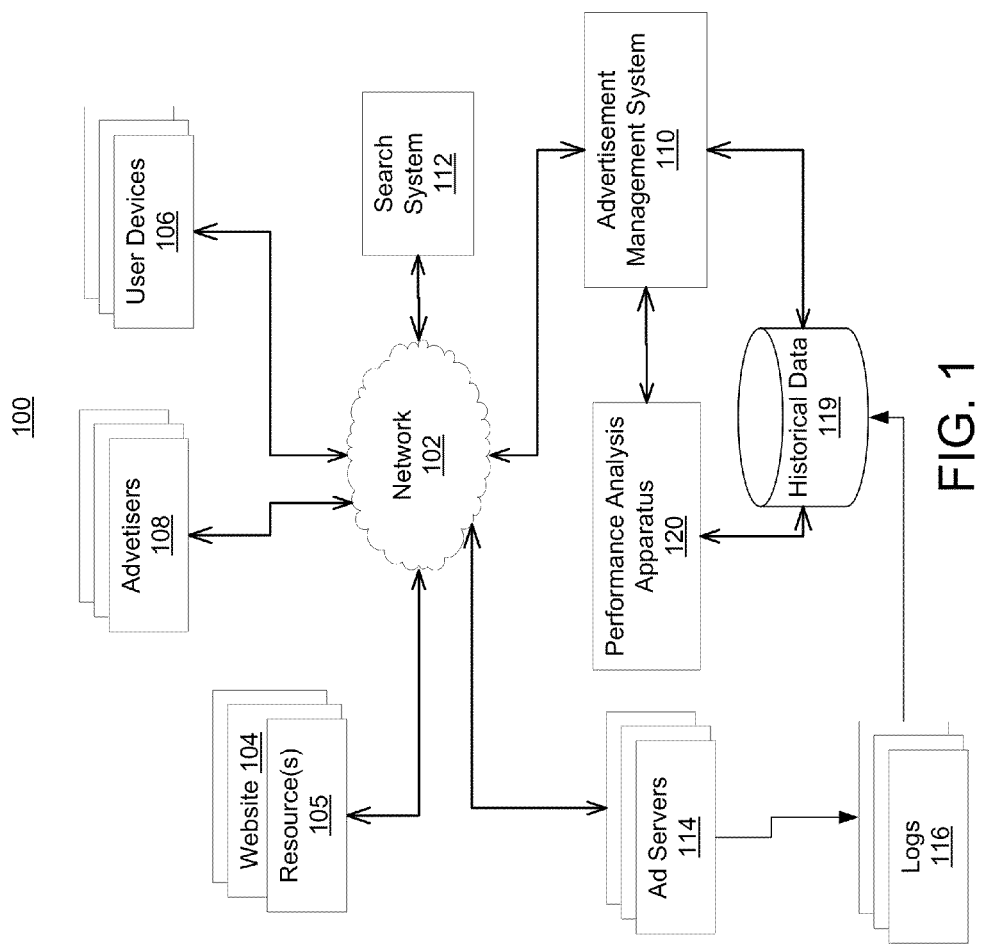
FIG. 1 is a block diagram of an example environment in which an advertisement management system manages advertising services, according to an illustrative embodiment.

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims. Like reference numbers and designations in the various drawings indicate like elements.

DETAILED DESCRIPTION

Following below are more detailed descriptions of various concepts related to, and embodiments of, methods, apparatuses and systems for analyzing conversion path data. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Content providers (e.g., advertisers) are provided with one or more user interfaces that allow for generation of various views or reports disclosing conversion paths data and/or performance metrics. Each conversion path is made up of one or more user interactions or events. In turn each user interaction or event is composed of one or more of the following fields or dimensions: source, medium, campaign, keyword, etc. In one of the exemplary user interfaces, the advertiser is allowed to choose a starting point for analysis of conversion path data by selecting a particular dimension. For example, the advertiser may select the "medium" dimension with a value "organic". In this example, once a starting point is selected by the advertiser, the user interface displays all the user interactions or events that preceded and followed the user interaction where the medium was "organic". The user interactions will show the breakdown of conversion paths that were taken to reach the starting point user interaction where the medium was "organic". All the following events will show the breakdown of conversion paths that followed the starting point user interaction where medium was "organic".

To allow the advertisers to examine all their conversion paths and quickly narrow down the user interactions they want to investigate further, the advertisers are allowed to segment the neighboring user interactions by one of the available dimensions (i.e., source, medium, campaign, keyword, etc.). As a result, the neighboring user interactions are aggregated together into groups or buckets based on the selected dimension. For example, the user can select the "source" dimension to segment the neighboring user interactions. In this example, all the user interactions with the same source values will be grouped together (e.g., user interactions with source="direct" get grouped together).

Each of the neighboring user interactions may be selectable by the advertiser to be added to an analysis sub-path. Initially, the analysis sub-path includes the starting point user interaction (i.e., medium="organic" in the example above). Once a neighboring user interaction is selected, it is added to the analysis sub-path. As additional user interactions are added to the sub-path, the neighboring user interactions are updated to only show those that precede or follow the complete analysis sub-path.

As used throughout this document, user interactions include any presentation of content to a user and any subsequent affirmative actions or non-actions (collectively referred to as "actions" unless otherwise specified) that a user takes in response to presentation of content to the user (e.g., selections of the content following presentation of the content, or non-selections of the content following the presentation of the content). Thus, a user interaction does not necessarily require a selection of the content (or any other affirmative action) by the user.

User interaction measures can include one or more of time lag measures (i.e., measures of time from one or more specified user interactions to a conversion), path length measures (i.e., quantities of user interactions that occurred prior to conversions), user interaction paths (i.e., sequences of user interactions that occurred prior to the conversion), assist interaction measures (i.e., quantities of particular user interactions that occurred prior to the conversion), and assisted conversion measures (i.e., quantities of conversions that were assisted by specified content).

FIG. 1 is a block diagram of an example environment in which an advertisement management system manages advertising services in accordance with an illustrative embodiment. The example environment 100 includes a network 102, such as a local area network (LAN), a wide area network (WAN), the Internet, or a combination thereof. The network 102 connects websites 104, user devices 106, advertisers 108, and an advertisement management system 110. The example environment 100 may include many thousands of websites 104, user devices 106, and advertisers 108.

A website 104 includes one or more resources 105 associated with a domain name and hosted by one or more servers. An example website is a collection of web pages formatted in hypertext markup language (HTML) that can contain text, images, multimedia content, and programming elements, such as scripts.

A resource 105 is any data that can be provided over the network 102. A resource 105 is identified by a resource address that is associated with the resource 105, such as a uniform resource locator (URL). Resources 105 can include web pages, word processing documents, portable document format (PDF) documents, images, video, programming elements, interactive content, and feed sources, to name only a few. The resources 105 can include content, such as words, phrases, images and sounds, that may include embedded information (such as meta-information in hyperlinks) and/or embedded instructions. Embedded instructions can include code that is executed at a user's device, such as in a web browser. Code can be written in languages such as JavaScript® or ECMAScript®.

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can include data specifying a portion of the resource or a portion of a user display (e.g., a presentation location of a pop-up window or in a slot of a web page) in which advertisements can be presented. These specified portions of the resource 105 or user display are referred to as advertisement slots.

To facilitate searching of the vast number of resources 105 accessible over the network 102, the environment 100 can include a search system 112 that identifies the resources 105 by crawling and indexing the resources 105 provided on the websites 104. Data about the resources 105 can be indexed based on the resource 105 with which the data is associated. The indexed and, optionally, cached copies of the resources 105 are stored in a search index (not shown).

User devices 106 can submit search queries to the search system 112 over the network 102. In response, the search system 112 accesses the search index to identify resources 105 that are relevant to the search query. In one illustrative embodiment, a search query includes one or more keywords. The search system 112 identifies the resources 105 that are responsive to the query, provides information about the resources 105 in the form of search results and returns the search results to the user devices 106 in search results pages. A search result can include data generated by the search system 112 that identifies a resource 105 that is responsive to a particular search query, and can include a link to the resource 105. An example search result can include a web page title, a snippet of text or a portion of an image extracted from the web page 104, a rendering of the resource 105, and the URL of the web page 104. Search results pages can also include one or more advertisement slots in which advertisements can be presented.

A search result page can be sent with a request from the search system 112 for the web browser of the user device 106 to set an HTTP (HyperText Transfer Protocol) cookie. A cookie can represent, for example, a particular user device 106 and a particular web browser. For example, the search system 112 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent page request to the same server or a server within the domain of the server will include the cookie. The cookie can store a variety of data, including a unique or semi-unique identifier. The unique or semi-unique identifier can be anonymized and is not connected with user names. Because HTTP is a stateless protocol, the use of cookies allows an external service, such as the search system 112 or other system, to track particular actions and status of a user over multiple sessions. A user may opt out of tracking user actions, for example, by disabling cookies in the browser's settings.

When a resource 105 or search results are requested by a user device 106 or provided to the user device 106, the advertisement management system 110 receives a request for advertisements to be provided with the resource 105 or search results. The request for advertisements can include characteristics of the advertisement slots that are defined for the requested resource 105 or search results page, and can be provided to the advertisement management system 110. For example, a reference (e.g., URL) to the resource 105 for which the advertisement slot is defined, a size of the advertisement slot, and/or media types that are available for presentation in the advertisement slot can be provided to the advertisement management system 110. Similarly, keywords (i.e., one or more words that are associated with content) associated with a requested resource 105 ("resource keywords") or a search query for which search results are requested can also be provided to the advertisement management system 110 to facilitate identification of advertisements that are relevant to the resource 105 or search query.

Based on data included in the request for advertisements, the advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries. In some implementations, advertisements having targeting keywords that match the resource keywords, the search query, or portions of the search query are selected as eligible advertisements by the advertisement management system 110.

The advertisement management system 110 selects an eligible advertisement for each advertisement slot of a resource 105 or of a search results page. The resource 105 or search results page is received by the user device 106 for presentation by the user device 106. User interaction data representing user interactions with presented advertisements can be stored in a historical data store 119. For example, when an advertisement is presented to the user via an ad server 114, data can be stored in a log file 116. This log file 116, as more fully described below, can be aggregated with other data in the historical data store 119. Accordingly, the historical data store 119 contains data representing the advertisement impression. For example, the presentation of an advertisement is stored in response to a request for the advertisement that is presented. For example, the ad request can include data identifying a particular cookie, such that data identifying the cookie can be stored in association with data that identifies the advertisement(s) that were presented in response to the request. In some implementations, the data can be stored directly to the historical data store 119.

Similarly, when a user selects (i.e., clicks) a presented advertisement, data representing the selection of the advertisement can be stored in the log file 116, a cookie, or the historical data store 119. In some implementations, the data is stored in response to a request for a web page that is linked to by the advertisement. For example, the user selection of the advertisement can initiate a request for presentation of a web page that is provided by (or for) the advertiser. The request can include data identifying the particular cookie for the user device, and this data can be stored in the advertisement data store.

User interaction data can be associated with unique identifiers that represent a corresponding user device with which the user interactions were performed. For example, in some implementations, user interaction data can be associated with one or more cookies. Each cookie can include content which specifies an initialization time that indicates a time at which the cookie was initially set on the particular user device 106.

The log files 116, or the historical data store 119, also store references to advertisements and data representing conditions under which each advertisement was selected for presentation to a user. For example, the historical data store 119 can store targeting keywords, bids, and other criteria with which eligible advertisements are selected for presentation. Additionally, the historical data store 119 can include data that specifies a number of impressions for each advertisement and the number of impressions for each advertisement can be tracked, for example, using the keywords that caused the advertisement impressions and/or the cookies that are associated with the impressions. Data for each impression can also be stored so that each impression and user selection can be associated with (i.e., stored with references to and/or indexed according to) the advertisement that was selected and/or the targeting keyword that caused the advertisement to be selected for presentation.

The advertisers 108 can submit, to the advertisement management system 110, campaign parameters (e.g., targeting keywords and corresponding bids) that are used to control distribution of advertisements. The advertisers 108 can access the advertisement management system 110 to monitor performance of the advertisements that are distributed using the campaign parameters. For example, an advertiser can access a campaign performance report that provides a number of impressions (i.e., presentations), selections (i.e., clicks), and conversions that have been identified for the advertisements. The campaign performance report can also provide a total cost, a cost-per-click, and other cost measures for the advertisement over a specified period of time. For example, an advertiser may access a performance report that specifies that advertisements distributed using the phrase match keyword "hockey" have received 1,000 impressions (i.e., have been presented 1,000 times), have been selected (e.g., clicked) 20 times, and have been credited with 5 conversions. Thus, the phrase match keyword hockey can be attributed with 1,000 impressions, 20 clicks, and 5 conversions.

As described above, reports that are provided to a particular content provider can specify performance measures measuring user interactions with content that occur prior to a conversion. A conversion occurs when a user performs a specified action, and a conversion path includes a conversion and a set of user interactions occurring prior to the conversion by the user. Any user interaction or user interactions can be deemed a conversion. What constitutes a conversion may vary from case to case and can be determined in a variety of ways. For example, a conversion may occur when a user clicks on an advertisement, is referred to a web page or website, and then consummates a purchase there before leaving the web page or website. As another example, a conversion may occur when a user spends more than a given amount of time on a particular website. Data from multiple user interactions can be used to determine the amount of time at the particular website.

Actions that constitute a conversion can be specified by each advertiser. For example, each advertiser can select, as a conversion, one or more measurable/observable user actions such as, for example, downloading a white paper, navigating to at least a given depth of a website, viewing at least a certain number of web pages, spending at least a predetermined amount of time on a website or web page, or registering on a website. Other actions that constitute a conversion can also be used.

To track conversions (and other interactions with an advertiser's website), an advertiser can include, in the advertiser's web pages, embedded instructions that monitor user interactions (e.g., page selections, content item selections, and other interactions) with advertiser's website, and can detect a user interaction (or series of user interactions) that constitutes a conversion. In some implementations, when a user accesses a web page, or another resource, from a referring web page (or other resource), the referring web page (or other resource) for that interaction can be identified, for example, by execution of a snippet of code that is referenced by the web page that is being accessed and/or based on a URL that is used to access the web page.

For example, a user can access an advertiser's website by selecting a link presented on a web page, for example, as part of a promotional offer by an affiliate of the advertiser. This link can be associated with a URL that includes data (i.e., text) that uniquely identifies the resource from which the user is navigating. For example, the link http://www.example.com/homepage/%affiliate_identifier%promotion_1 specifies that the user navigated to the example.com web page from a web page of the affiliate that is associated with the affiliate identifier number that is specified in the URL, and that the user was directed to the example.com web page based on a selection of the link that is included in the promotional offer that is associated with promotion_1. The user interaction data for this interaction (i.e., the selection of the link) can be stored in a database and used, as described below, to facilitate performance reporting.

When a conversion is detected for an advertiser, conversion data representing the conversion can be transmitted to a data processing apparatus ("analytics apparatus") that receives the conversion data, and in turn, stores the conversion data in a data store. This conversion data can be stored in association with one or more cookies for the user device that was used to perform the user interaction, such that user interaction data associated with the cookies can be associated with the conversion and used to generate a performance report for the conversion.

Traditionally, a conversion is attributed to a targeting keyword when an advertisement that is targeted using the targeted keyword is the last clicked advertisement prior to the conversion. Alternatively, the credit for the conversion is attributed to all or some of the transactions preceding the conversion. For example, advertiser X may associate the keywords "tennis," "shoes," and "Brand-X" with advertisements. In this example, assume that a user submits a first search query for "tennis," the user is presented a search result page that includes advertiser X's advertisement, and the user selects the advertisement, but the user does not take an action that constitutes a conversion. Assume further that the user subsequently submits a second search query for "Brand-X," is presented with the advertiser X's advertisement, the user selects advertiser X's advertisement, and the user takes action that constitutes a conversion (e.g., the user purchases Brand-X tennis shoes). In this example, the keyword "Brand-X" will be credited with the conversion because the last advertisement selected prior to the conversion ("last selected advertisement") was an advertisement that was presented in response to the "Brand-X" being matched.

Providing conversion credit to the keyword that caused presentation of the last selected advertisement ("last selection credit") prior to a conversion is a useful measure of advertisement performance, but this measure alone does not provide advertisers with data that facilitates analysis of a conversion cycle that includes user exposure to, and/or selection of, advertisements prior to the last selected advertisement. For example, last selection credit measures alone do not specify keywords that may have increased brand or product awareness through presentation of advertisements that were presented to, and/or selected by, users prior to selection of the last selected advertisement. However, these advertisements may have contributed significantly to the user subsequently taking action that constituted a conversion.

In the example above, the keyword "tennis" is not provided any credit for the conversion, even though the advertisement that was presented in response to a search query matching the keyword "tennis" may have contributed to the user taking an action that constituted a conversion (e.g., making a purchase of Brand-X tennis shoes). For instance, upon user selection of the advertisement that was presented in response to the keyword "tennis" being matched, the user may have viewed Brand-X tennis shoes that were available from advertiser X. Based on the user's exposure to the Brand-X tennis shoes, the user may have subsequently submitted the search query "Brand-X" to find the tennis shoes from Brand-X. Similarly, the user's exposure to the advertisement that was targeted using the keyword "tennis," irrespective of the user's selection of the advertisement, may have also contributed to the user subsequently taking action that constituted a conversion (e.g., purchasing a product from advertiser X). Analysis of user interactions, with an advertiser's advertisements (or other content), that occur prior to selection of the last selected advertisement can enhance an advertiser's ability to understand the advertiser's conversion cycle.

A conversion cycle is a period that begins when a user interacts with the advertiser's content. In one example embodiment, the conversion cycle may begin with the user being presented by an advertisement and ends at a time at which the user takes action that constitutes a conversion. A conversion cycle can be measured and/or constrained by time or actions and can span multiple user sessions. In an example embodiment, the conversion cycle may be the expected amount of time that a user would interact initially with the advertiser to when the user completes the conversion. Various metrics may be calculated based on the aggregated conversion paths. The aggregate conversion paths can be used to calculate the average number of interactions, duration, etc. User sessions are sets of user interactions that are grouped together for analysis. Each user session includes data representing user interactions that were performed by a particular user and within a session window (i.e., a specified period). The session window can be, for example, a specified period of time (e.g., 1 hour, 1 day, or 1 month) or can be delineated using specified actions. For example, a user search session can include user search queries and subsequent actions that occur over a 1 hour period and/or occur prior to a session ending event (e.g., closing of a search browser).

Analysis of a conversion cycle can enhance an advertiser's ability to understand how its customers interact with advertisements over a conversion cycle. For example, if an advertiser determines that, on average, an amount of time from a user's first exposure to an advertisement to a conversion is 20 days, the advertiser can use this data to infer an amount of time that users spend researching alternative sources prior to converting (i.e., taking actions that constitute a conversion). Similarly, if an advertiser determines that many of the users that convert do so after presentation of advertisements that are targeted using a particular keyword, the advertiser may want to increase the amount of money that it spends on advertisements distributed using that keyword and/or increase the quality of advertisements that are targeted using that particular keyword.

Measures of user interactions that facilitate analysis of a conversion cycle are referred to as conversion path performance measures. A conversion path is a set of user interactions by a particular user prior to and including a conversion by the particular user. Conversion path performance measures specify durations of conversion cycles, numbers of user interactions that occurred during conversion cycles, paths of user interactions that preceded a conversion, numbers of particular user interactions that occurred preceding conversions, as well as other measures of user interaction that occurred during conversion cycles, as described in more detail below.

The advertisement management system 110 includes a performance analysis apparatus 120 that determines conversion path performance measures that specify measures of user interactions with content items during conversion cycles. The performance analysis apparatus 120 tracks, for each advertiser, user interactions with advertisements that are provided by the advertiser, determines (i.e., computes) one or more conversion path performance measures, and provides data that cause presentation of a performance report specifying at least one of the conversion path performance measures. Using the performance report, the advertiser can analyze its conversion cycle, and learn how each of its keywords cause presentation of advertisements that facilitate conversions, irrespective of whether the keywords caused presentation of the last selected advertisement. In turn, the advertiser can adjust campaign parameters that control distribution of its advertisements based on the performance report.

Configuration options can be offered to reduce bias in performance reports. Without configuration options, some performance reports can be biased, such as towards short conversion paths. For example, a performance report can be biased towards short conversion paths if data used as a basis for the report includes a percentage of partial conversion paths which is higher than a threshold percentage. A partial conversion path is a conversion path in which some but not all user interaction data for a user is associated with a conversion. A partial conversion path can be included in a report if, for example, the report is generated using a reporting period which is less then the length of a typical conversion cycle for the advertiser who requested the report.

A reporting period determines the maximum length (in days) of a reported conversion cycle because additional data outside of the reporting period is not used to generate the report. A performance report can be based on a reporting period (i.e., lookback window), such that user interactions prior to the reporting period are not considered part of the conversion cycle when generating the report. Such a reporting period is referred to as a "lookback window". For example, when generating a report with a lookback window of thirty days, available user interaction data representing user actions that occurred between July 1 and July 31 of a given year would be available for a conversion that occurred on July 31 of that year.

If a default lookback window (e.g., thirty days) is used, the performance report can be biased towards short conversion paths if the typical conversion cycle length for a product associated with the report is greater than the default lookback window. For instance, in the example above, a typical conversion cycle for "Brand-X" tennis shoes may be relatively short (e.g., thirty days) as compared to a conversion cycle for a more expensive product, such as a new car. A new car may have a much longer conversion cycle (e.g., ninety days).

Different advertisers or different products for an advertiser can have different associated conversion cycle lengths. For example, an advertiser that sells low cost (e.g., less than $100) products may specify a lookback window of 30 days, while an advertiser that sells more expensive products (e.g., at least $1000) may specify a lookback window of 90 days.

In some implementations, an advertiser 108 can specify a lookback window to use when requesting a performance report, such as by entering a number of days or by selecting a lookback window from a list of specific lookback windows (e.g., thirty days, sixty days, ninety days). Allowing an advertiser to configure the lookback window of their performance reports enables the advertiser to choose a lookback window that corresponds to conversion cycles of their products. Allowing lookback window configuration also enables advertisers to experiment with different lookback windows, which can result in the discovery of ways to improve conversion rates.

Other factors can contribute to reporting on partial conversion paths. For example, as mentioned above, user interaction data used as a basis for a report can be associated with unique identifiers that represent a user device with which the user interactions were performed. As described above, a unique identifier can be stored as a cookie. Cookies can be deleted from user devices, such as by a user deleting cookies, a browser deleting cookies (e.g., upon browser exit, based on a browser preference setting), or some other software (e.g., anti-spyware software) deleting cookies.

If cookies are deleted from a user device, a new cookie will be set on the user's device when the user visits a web page (e.g., the search system 112). The new cookie may be used to store a new quasi-unique identifier, and thus subsequent user interaction data that occurs on the user device may be associated with a different identifier. Therefore, because each user identifier is considered to represent a different user, the user interaction data associated with the deleted cookies are identified as being associated with a different user than the user interaction data that is associated with the new cookies.

For instance, in the example above, assume that the user deletes cookies after the first search query for "tennis" is performed and that the second search query for "Brand-X" occurs after the cookies are deleted. In this example, performance measures computed based on the user interaction data for the user can show a bias. For example, a path length measure can be computed as one, rather than two, since the advertisement selection resulting from the first search query is not considered part of the same conversion cycle as the advertisement selection resulting from the second search query, since the two user interactions do not appear to have been performed by the same user.

To view a report which reduces bias caused from partial conversion paths, an advertiser can specify a lookback window for the report. As described above, the lookback window specifies that the user interaction data used to generate the report are user interaction data that are associated with unique identifiers that have initialization times that are prior to a specified period (e.g., thirty days, sixty days, ninety days) before the conversions. Thus, conversions for which user interaction data that are associated with unique identifiers having initialization times that are after the specified period are excluded from inclusion as a basis for the report. A unique identifier that has a recent initialization time indicates that the unique identifier may have been recently reinitialized on the user device that the unique identifier represents. Accordingly, user interaction data associated with the relatively new unique identifier may represent only a partial conversion path. Alternatively, conversions for which user interaction data that are associated with unique identifiers having initialization times that are after the specified period are included in the report. To reduce bias, any user interaction included in the conversion path that occurred after the specified period are removed from the conversion path prior to being included in the report.

Although FIG. 1 illustrates a single network 102, the environment 100 can include a plurality of communication networks and/or the plurality of communication networks can be configured in a plurality of ways (e.g., a plurality of interconnected local area networks (LAN), a plurality of interconnected wide area networks (WAN), a plurality of interconnected LANs and/or WANs, etc.). Similarly, although FIG. 1 illustrates the advertisement management system 110, the environment 100 can include any number of advertisement management systems. Other third party systems may analyze and display performance metrics managed by the advertisement management system 110 to the advertisers.

Figure 2:
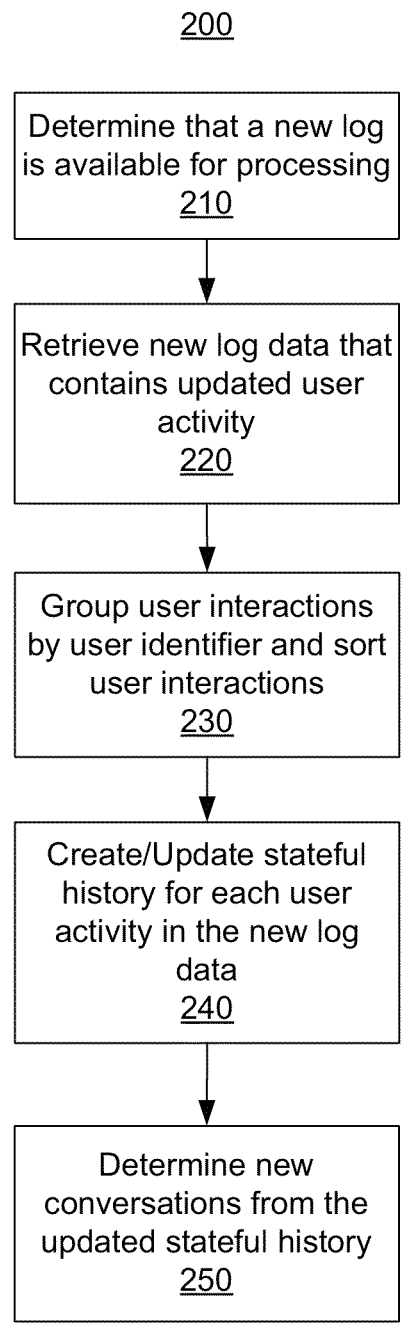
FIG. 2 is a flow diagram of a process for integrating user interaction log data, according to an illustrative embodiment.

FIG. 2 is a flow diagram of a process for updating user interaction log data in accordance with an illustrative embodiment. The process 200 is a process that updates conversion paths and determines conversions based upon the updated conversion paths of users.

The process 200 can be implemented on the advertisement management system 110, the performance analysis apparatus 120, or another computing device. In one implementation, the process 200 is encoded on a computer-readable medium that contains instructions that when executed by a computing device cause the computing device to perform operations of process 200.

As described above, log files 116 may contain user interaction data. A log file 116 may be combined with user interaction data from other logs from other servers, including those that implement the search system 112, prior to processing. Processing starts with the computing device that implements the process 200 determining that a new log is available for processing (210). For example, a notification can be sent to the computing device indicating that a new log is ready for processing, or the existence of a new log can indicate that the new log is ready for processing.

Figure 3:
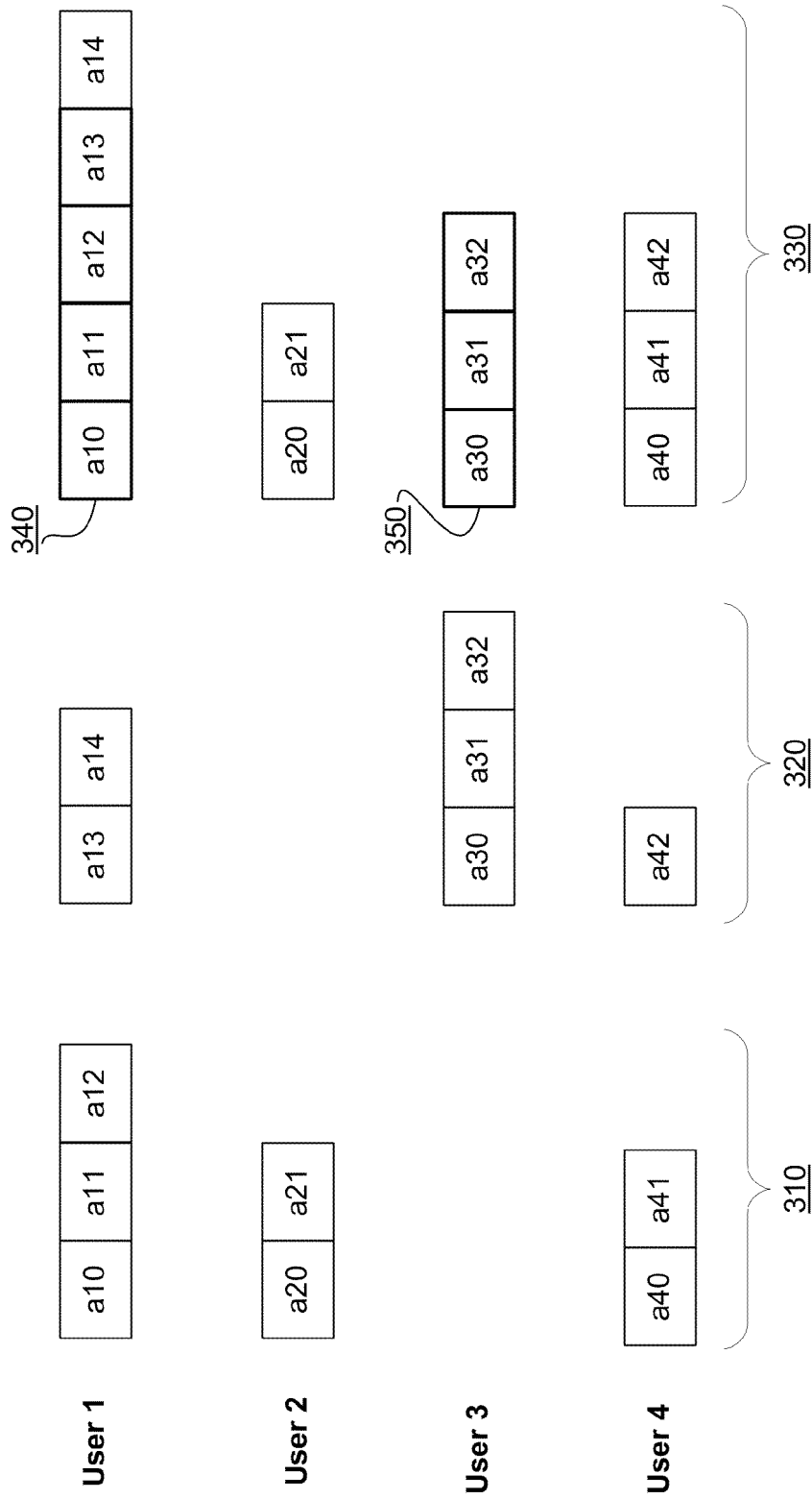
FIG. 3 is a block diagram that illustrates user interaction data being updated during a user interaction log data integration process, according to an illustrative embodiment.

Next, the new log is retrieved (220). The new log may be retrieved over the network 102. The stateful history for each user is updated based upon the user activity indicated by the new log. The new log can contain information relating to user interactions for numerous users. The historical data store 119 contains user interaction data from previously processed log files. The user interaction data contained within the historical data store 119 can be stateful, in that the user interaction data can be grouped by user identifier and ordered chronologically. FIG. 3 is a block diagram that illustrates user interaction data being updated during a user interaction log data integration process 200 in accordance with an illustrative embodiment. FIG. 3 illustrates four example user identifiers, although the historical data store 119 and log files 116 can contain data associated with thousands or millions of different user identifiers. In one embodiment, previously stored user interaction data 310 are stored in the historical data store 119. As illustrated, no user interaction data associated with user identifier 3 has been previously stored in the historical data store 119.

The new log can contain user interaction data for one or more user identifiers. The user interaction data can be grouped by user identifiers and then sorted chronologically (230). Column 320 illustrates grouped and sorted user interaction data. As illustrated, user identifier 2 does not include any new user interaction data, and user identifiers 1, 3, and 4 have updated user interaction data. For instance, the new log file includes user interaction data associated with user interactions $a_{13}$ and $a_{14}$ that are associated with user identifier 1. The grouped and sorted user interaction data can then merged with the user interaction data stored in the historical data store 119 (240). If a user identifier previously existed in the historical data store 119, the new user interaction data are added to the previous user interaction data. Otherwise, the new user interaction data is added with a new user identifier.

Column 330 illustrates the updated user interaction data for each of the user identifiers. Based upon the updated user interaction data, any conversions that occurred in each of the updated paths of user interactions can be determined (250).

User interaction paths are constrained to those user interactions that are related to a particular advertiser 108. The conversion interactions of the particular advertiser 108 are used to determine if a conversion has occurred. As an example, assume that user interactions $a_{13}$ and $a_{32}$ represent conversion interactions. Accordingly, conversion paths 340 and 350 are found. Once found, the conversion paths can be written to another portion of the historical data store 119 or another data store for further analysis.

The advertisement management system 110 and/or the performance analysis apparatus 120 can be realized by instructions that upon execution cause one or more processing devices to carry out the processes and functions described above. Such instructions can comprise, for example, interpreted instructions, such as script instructions, executable code, or other instructions stored in a computer-readable medium. The advertisement management system 110 and/or the performance analysis apparatus 120 can be distributively implemented over a network, such as a server farm, or can be implemented in a single computer device.

Figure 4:
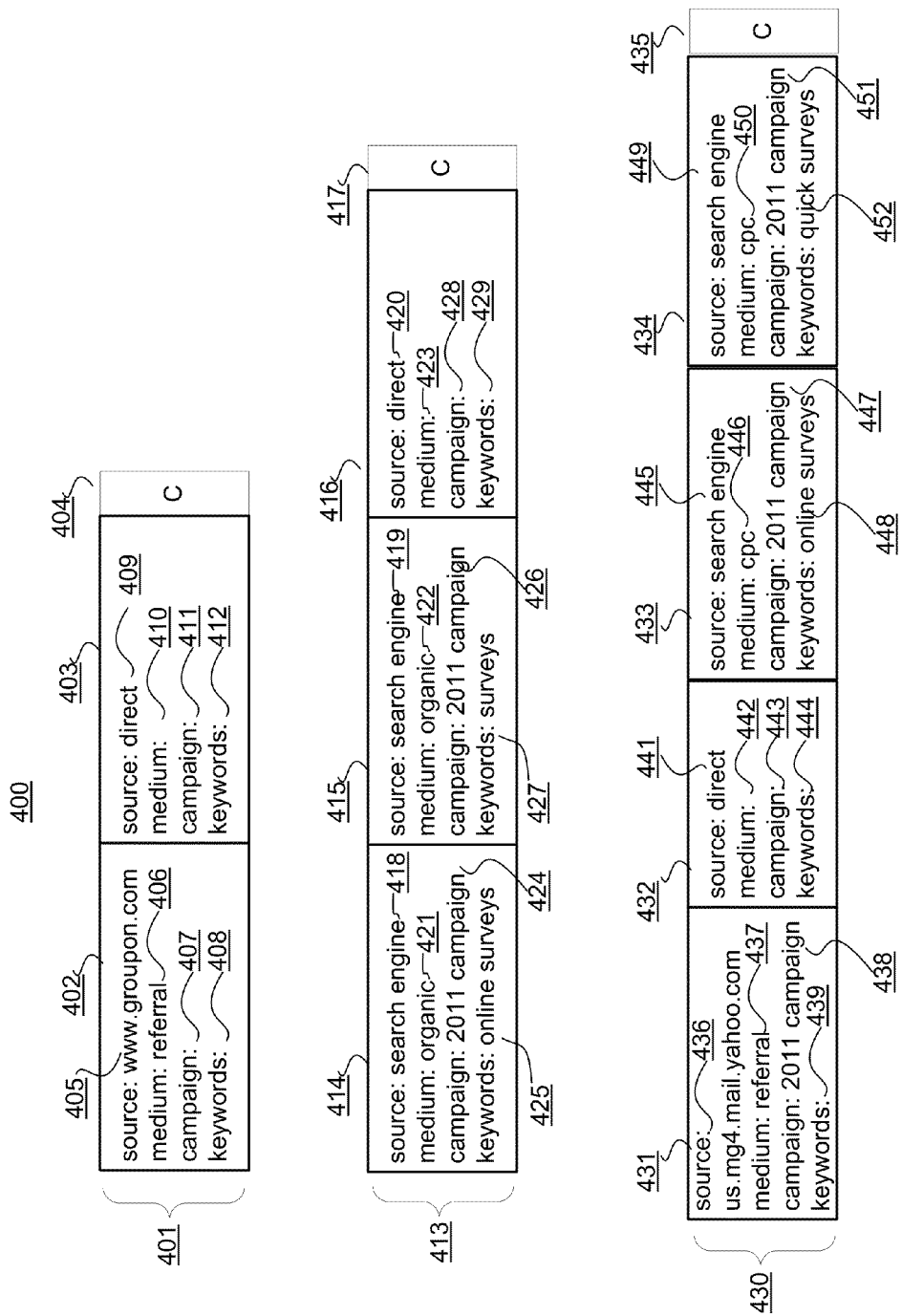
FIG. 4 is a block diagram that illustrates exemplary conversion paths, according to an illustrative embodiment.

FIG. 4 is a block diagram that illustrates exemplary conversion paths 401, 413, and 430 in accordance with an illustrative embodiment. As shown, one or more user interactions are associated with each conversion path. In turn, four (or more or less) dimensions can be associated with each user interaction including a source dimension, a medium dimension, a campaign dimension, and a keywords dimension. The source dimension indicates the source of a referral to a website, while the medium dimension provides further information regarding the source dimension. For example, the source dimension can indicate a particular search engine as the referring source. In this example, the medium dimension can further classify the source as being "cost-per-click" (i.e., if the user clicked on a sponsored link) or "organic" (i.e., if the user clicked on an unpaid search results link).

The campaign dimension allows an advertiser to differentiate between various advertising campaigns. For example, an advertiser may have two concurrently running advertising campaigns that refer users to one or more common page(s). The campaign dimension allows the various user interactions related to various campaigns to be separated from one another. This gives an advertiser the ability to analyze the campaigns independently of one another. The keywords dimension contains one or more words a user used in a search. Although four dimensions are listed for each user interaction, any number of other dimensions (e.g., a date of the user interaction, a time of the user interaction, country/territory, landing page title, browser name, browser version, content such as advertisement version, etc.) can be associated with each user interaction.

The conversion path 401 includes user interactions 402, 403, and 404. The user interaction 404 is a conversion event. The user interaction 402 has dimensional data associated with the source dimension 405 and the medium dimension 406, which indicates that the user was referred to the advertiser's web page from a web page "www.groupon.com". The campaign dimension 407 and the keywords dimension 408 have no associated data. The dimensional data associated with the source dimension 409 of the user interaction 403 indicates that the user came to the advertiser's web page "directly". The medium dimension 410, the campaign dimension 411, and the keywords dimension 412 have no dimensional data. Accordingly, the dimensional data for the conversion path 401 indicates that before the conversion event, the user first visited the "www.groupon.com" web page and then was referred directly to the advertiser's web page.

The conversion path 413 includes four user interactions 414, 415, 416, and 417. The user interaction 417 is a conversion event. The dimensional data (i.e., data for dimensions 418, 421, 424, and 425) associated with the user interaction 414 indicates that the user performed a keyword (i.e., using "online surveys" keywords from the "2011 campaign") search using a search engine, and then clicked on an unpaid link in the search results before converting. Similarly, the dimensional data (i.e., dimensions 419, 422, 426, and 427) associated with the user interaction 415 following the user interaction 414 indicates that the user performed a keyword search using a search engine, and then clicked on an unpaid link in the search results before converting, except that the user used "surveys" keyword for the search. According to the dimensional data associated with the final user interaction 416 prior to the conversion 417, the user directly visited the advertiser's web page. Accordingly, in the conversion path 413, the user performed two search engine searches with different sets of keywords, and then directly visited the advertiser's web page before converting.

The third conversion path 430 illustrated in FIG. 4 includes five user interactions 431, 432, 433, and 434. The user interaction 435 is a conversion event. The dimensional data (i.e., data for dimensions 436-444) associated with the user interactions 431 and 432 indicates that the user visited a web site "us.mg4.mail.yahoo.com" and was referred to the advertiser's web page using the "2011 campaign". The dimensional data (i.e., dimensions 419, 422, 426, and 427) associated with the user interaction 433 following the user interactions 431 and 432 indicates that the user performed a keyword search using a search engine and "online surveys" keywords, and then clicked on a paid link in the search results before converting. Similarly, the dimensional data (i.e., dimensions 449, 450, 451, and 452) associated with the user interaction 434 following the user interactions 431, 432 and 433 indicates that the user performed a keyword search using a search engine and "quick surveys" keywords, and then clicked on a paid link in the search results before converting. Accordingly, the dimensional data for the user interactions 431, 432, 433, and 434 indicates that the user first visited "us.mg4.mail.yahoo.com", which referred the user directly to the advertiser's web page, followed by two search engine searches. The conversion paths 401, 413, and 430 can be used for dynamically exploring conversion paths using user interfaces illustrated in FIGS. 6A-6J.

Figure 5A:
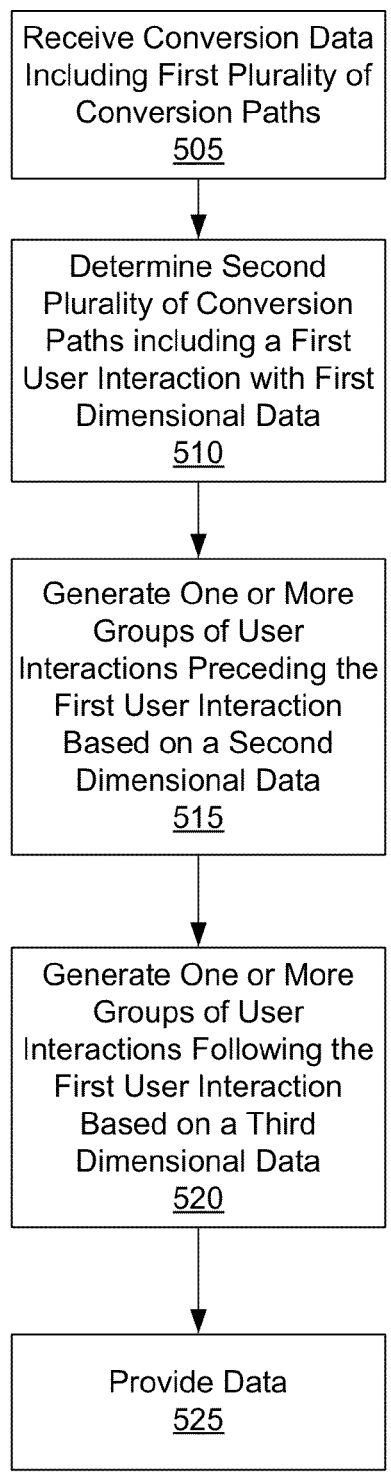
FIGS. 5A-5B are flow diagrams that illustrate generating groups of user interactions, according to an illustrative embodiment.

FIG. 5A is a flow diagram illustrating a process 500a, employed by the advertisement management system 110 of FIG. 1 for determining groups of user interactions based on dimensional data. The process 500a can be implemented on the advertisement management system 110, the performance analysis apparatus 120, or another computing device. In one implementation, the process 500a is encoded on a computer-readable medium that contains instructions that when executed by a computing device cause the computing device to perform operations of process 500a.

At block 505, conversion data, including conversion path data for a first plurality of conversion paths, is received. The conversion data may correspond to one or more users, and one or more advertisement campaigns managed by one or more advertisers. Each conversion path includes user interaction data prior to and including a conversion event. Conversion path data may also include one or more performance measures (e.g., a path length measure) for each conversion path in the plurality of conversion paths. Each user interaction in the conversion path includes data for one or more dimensions (i.e., source dimension, medium dimension, campaign dimension, keyword dimension, etc.). Exemplary conversion paths with their dimensional data are illustrated in FIG. 4.

A second plurality of conversion paths including a first user interaction with a first dimensional data is determined (block 510). In some embodiments, the first dimensional data includes a dimension type (e.g., source dimension, medium dimension, campaign dimension, keyword dimension, or another type of dimension). In these embodiments, the first dimensional data may further include a dimension type value. For example, dimensional data can include a dimension type "source" and dimension value "direct". In this example, the second plurality of conversion paths is determined based on all conversion paths that include the first user interaction with the dimension type "source" and dimension value "direct". The first dimensional data may be a predetermined dimensional data (e.g., received from or defined by a user input or other source). All the conversion paths that do not include the first user interaction are excluded from the second plurality of conversion paths. Accordingly, the second plurality of conversion paths may be a subset of the first plurality of conversion paths.

At block 515, one or more groups of user interactions in the second plurality of conversion paths preceding the first user interaction are determined based on a second dimensional data. In some embodiments, the second dimensional data indicates a dimension type (e.g., source dimension, medium dimension, campaign dimension, keyword dimension, or another type of dimension). The user interactions in the second plurality of conversion paths preceding the first user are segmented into groups based on the dimension type indicated in the second dimensional data. For example, the second dimensional data includes a "source" dimension type. Accordingly, the user interactions preceding the first user interaction with the first dimensional data are aggregated together into the one or more groups based on the "source" dimension type. In this example, all the user interactions having "source" dimension type value "direct" are aggregated together into a group, all the user interactions with another value for "source" dimension type are aggregated together into another group, etc.

At block 520, one or more groups of user interactions in the second plurality of conversion paths following the first user interaction with the first dimensional data are determined based on a third dimensional data. In some embodiments, the third dimensional data indicates a dimension type (e.g., source dimension, medium dimension, campaign dimension, keyword dimension, or another type of dimension). The user interactions in the second plurality of conversion paths following the first user interaction are segmented into groups based on the dimension type indicated in the third dimensional data. For example, the third dimensional data includes a "source" dimension type. Accordingly, the user interactions following the first user interaction are aggregated together into the one or more groups based on the "source" dimension type. In this example, all the user interactions having "source" dimension type value "direct' are aggregated together into a group, all the user interactions with another value for "source" dimension type are aggregated together into another group, etc.

In some embodiments, the second dimensional data and the third dimensional data include different data. For example, the second dimensional data may indicate a "source" dimension type, while the third dimensional data may indicate a "medium" dimension type. In other embodiments, the second dimensional data and the third dimensional data can include the same dimension type. The second dimensional data and the third dimensional data may be selected by the advertiser using a user interface. For example, a dimension type drop down 636 in FIGS. 6C-6J allows the advertiser to select a dimension type for segmenting user interactions preceding and following an analysis sub-path 632. In this example, the second dimensional data and the third dimensional data would include the value selected by the user using the dimension type drop down 636. Although not shown, the user interface may include a second drop down for separately selecting a dimension type for the user interactions preceding the sub-path and a dimension type for the user interactions following the sub-path.

At block 525, data associated with the one or more groups of user interactions preceding the user interaction with first dimensional data, and the one or more groups of user interactions following the user interaction with first dimensional data are provided. For example, the data may be provided to a user interface for display of the various groups as shown in FIGS. 6C-6J. In FIG. 6C, the one or more groups of user interactions preceding the user interaction with first dimensional data would correspond to the groups 630, while the one or more groups of user interactions following the user interaction with first dimensional data would correspond to the groups 634. The data associated with each of the groups may include performance data (e.g., total number of conversion for the group, total conversion value for the group, etc.).

Figure 5B:
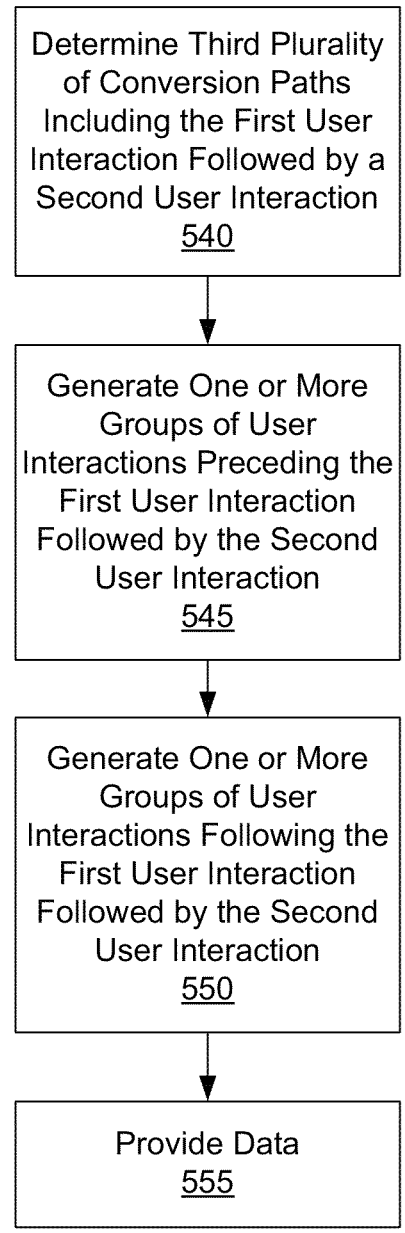

FIG. 5B is a flow diagram illustrating a process 500b, employed by the advertisement management system 110 of FIG. 1 for determining groups of user interactions based on dimensional data. The process 500b can be implemented on the advertisement management system 110, the performance analysis apparatus 120, or another computing device. In one implementation, the process 500b is encoded on a computer-readable medium that contains instructions that when executed by a computing device cause the computing device to perform operations of process 500b.

In some embodiments, the steps illustrated in FIG. 5B follow the steps shown in FIG. 5A. For example, once the data regarding the various groups of user interactions is provided for display on a user interface, the user may choose to select a user interaction to be added to the analysis sub-path. Initially, the analysis sub-path included the first user interaction.

At block 540, a third plurality of conversion paths including the first user interaction followed by a second user interaction is determined. In some embodiments, the second user interaction includes fourth dimensional data, which in turn may include a dimension type (e.g., source dimension, medium dimension, campaign dimension, keyword dimension, or another type of dimension) and dimension type value. For example, the first dimensional data can include a dimension type "source" and dimension value "direct", and the fourth dimensional data can include a dimension type "source" and dimension value "search engine". In this example, the third plurality of conversion paths includes all conversion paths that include the first user interaction with a dimension type "source" and dimension value "direct", followed by the second user interaction with a dimension type "source" and dimension value "search engine". All the conversion paths that do not include the first user interaction followed by the second user interaction are excluded from the third plurality of conversion paths. Accordingly, the third plurality of conversion paths is a subset of the second plurality of conversion paths.

At block 545, one or more groups of user interactions preceding the first user interaction followed by the second user interaction is determined. In some embodiments, the one or more groups determined in block 545 are generated using the second dimensional data. In other embodiments, another dimensional data is used for generating the one or more groups. The user interactions in the third plurality of conversion paths preceding the first user interaction followed by the second user interaction are segmented into groups based on the dimension type indicated in the second dimensional data or another dimensional data. For example, the second dimensional data can include a "source" dimension type. Accordingly, the user interactions preceding the first user interaction followed by the second user interaction are aggregated together into the one or more groups based on the "source" dimension type. In this example, all the user interactions having "source" dimension type value "direct' are aggregated together into a group, all the user interactions with another value for "source" dimension type are aggregated together into another group, etc.

At block 550, one or more groups of user interactions following the first user interaction followed by the second user interaction are generated. In some embodiments, the one or more groups determined in block 550 are generated by on the third dimensional data. In other embodiments, another dimensional data is used for generating the one or more groups The user interactions in the third plurality of conversion paths following the first user interaction followed by the second interaction are segmented into groups based on the dimension type indicated in the third dimensional data or another dimensional data. For example, the third dimensional data can include a "source" dimension type. Accordingly, the user interactions following the first user interaction followed by the second user interaction are aggregated together into the one or more groups based on the "source" dimension type. In this example, all the user interactions having "source" dimension type value "direct' are aggregated together into a group, all the user interactions with another value for "source" dimension type are aggregated together into another group, etc.

At block 555, data associated with associated with the one or more groups of user interactions preceding the first user interaction followed by the second user interaction, and the one or more groups of user interactions following the first user interaction followed by the second use interaction are provided. For example, the data may be provided to a user interface for display of the various groups as shown in FIGS. 6C-6J. In FIG. 6F, the user interaction 646 represents the second user interaction, and the groups 630 in FIG. 6G represent the one or more groups preceding the first user interaction followed by the second user interaction, while groups 634 represent the one or more groups following the first user interaction followed by the second user interaction. The data associated with each of the groups may include performance data (e.g., total number of conversion for the group, total conversion value for the group, etc.).

FIGS. 6A-6J illustrate various user interfaces for dynamically exploring conversion paths, according to illustrative embodiments. In other embodiments, other user interfaces may be employed that would allow advertisers to dynamically explore conversion paths by looking at various dimensions that make up individual user interactions.

Figure 6A:
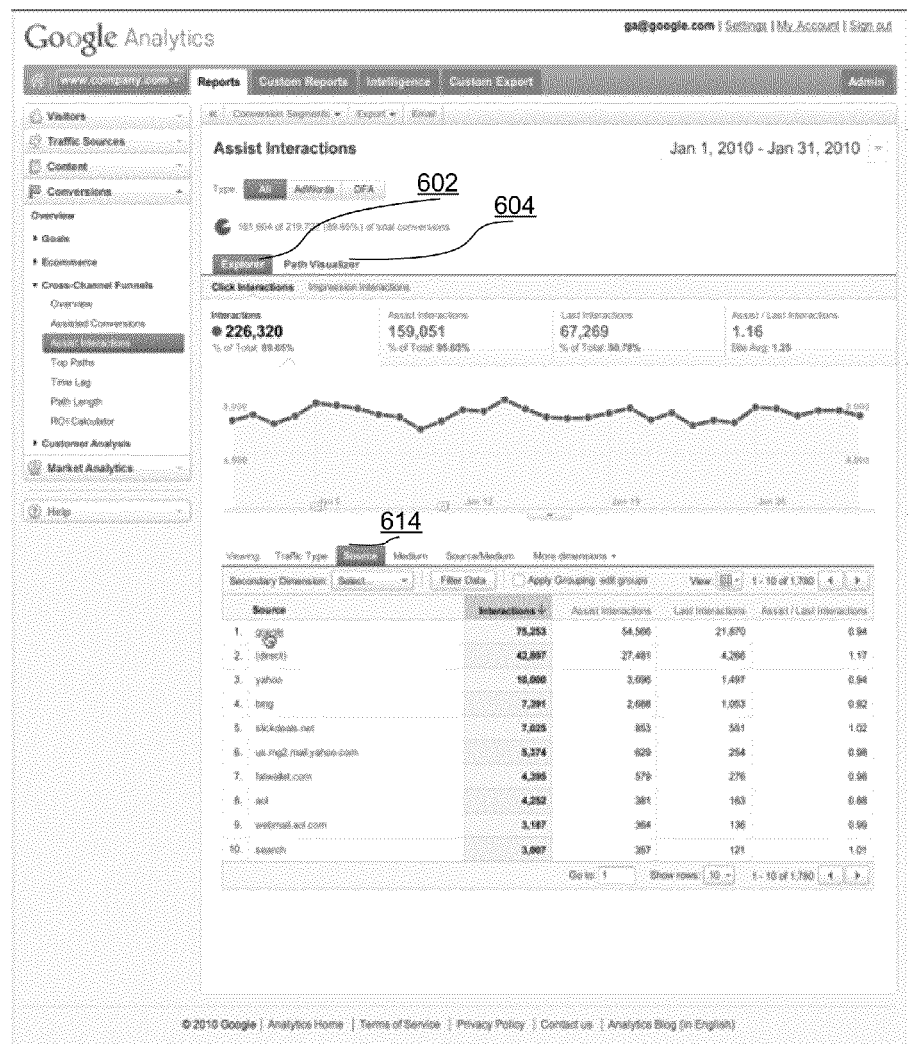
FIGS. 6A-6J illustrate exemplary user interfaces allowing for dynamically exploring conversion paths, according to illustrative embodiments.
Figure 6B:
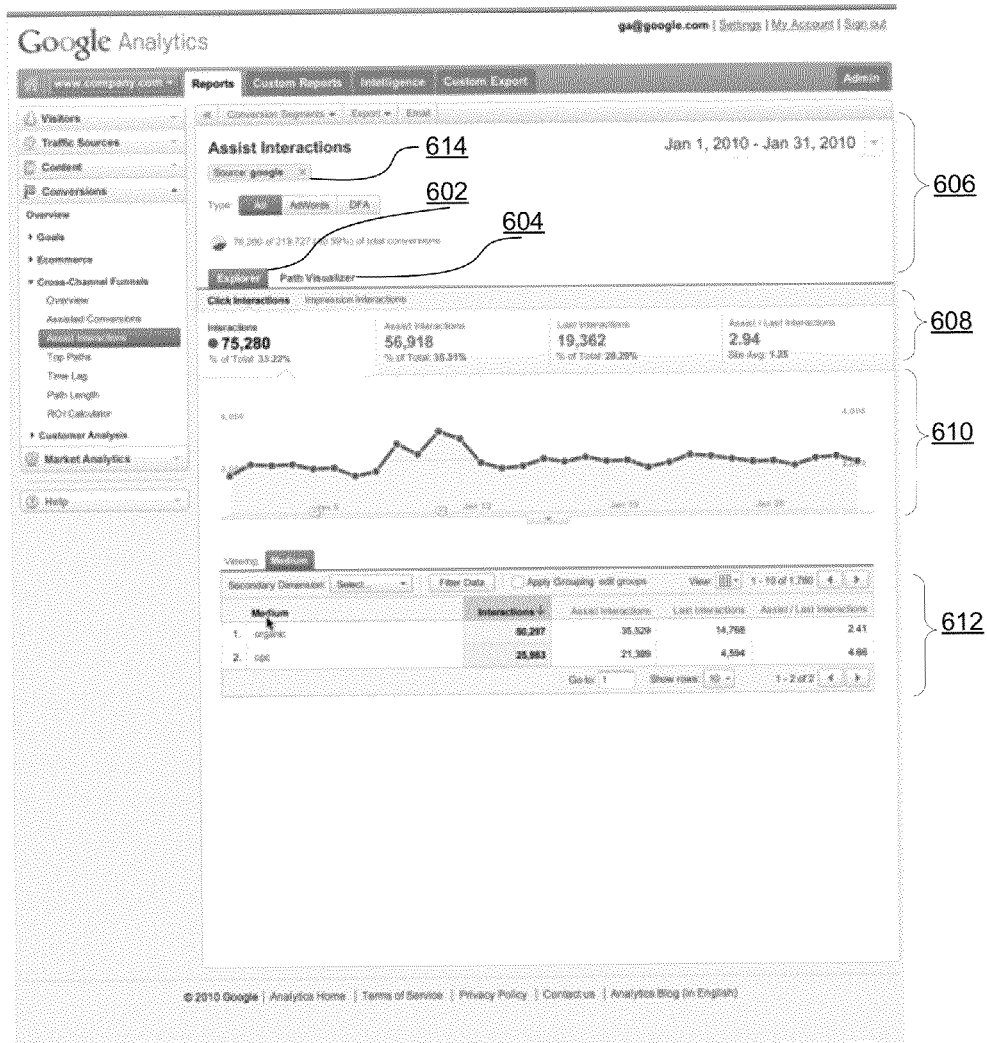
Figure 6C:
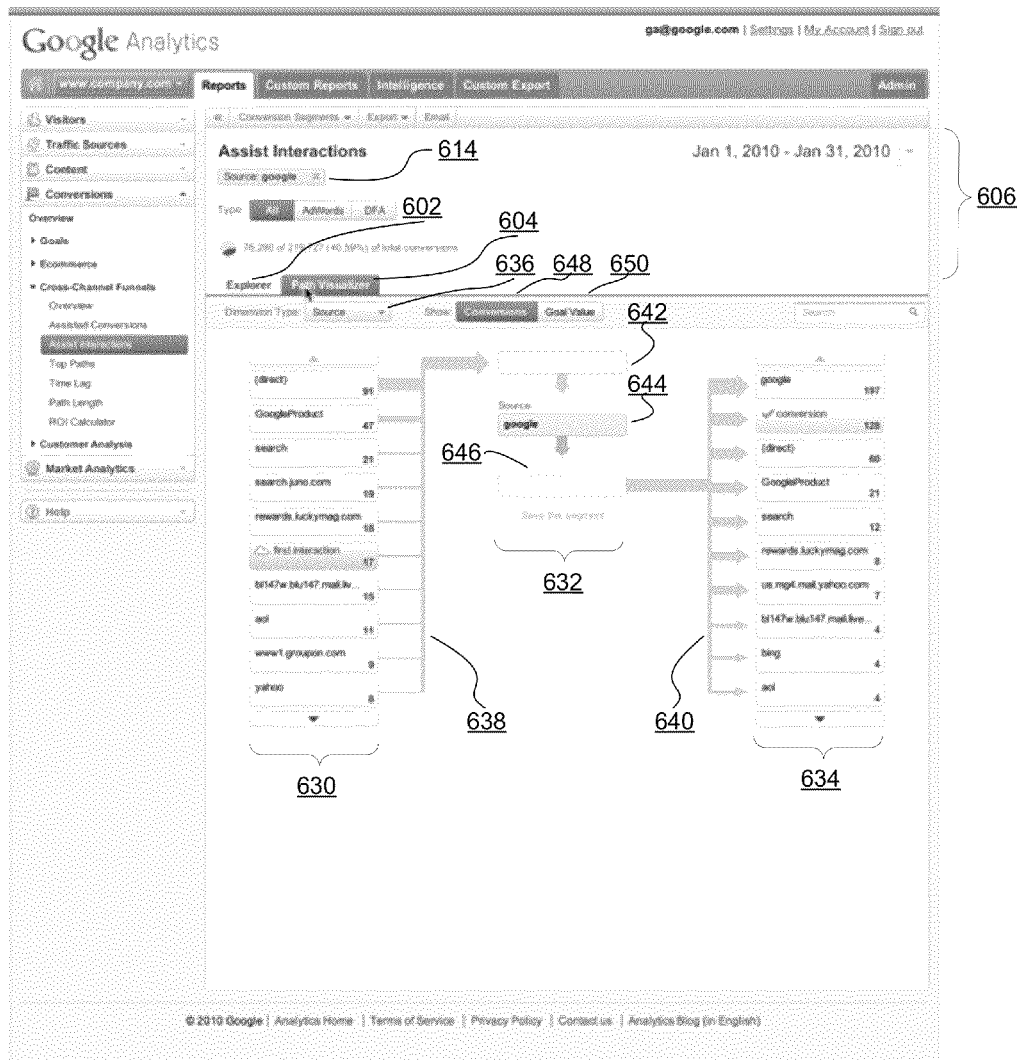

FIGS. 6A and 6B are illustrative user interfaces 600a and 600b displaying an explorer view 602 which illustrates various performance metrics. A panel 606 allows advertisers to filter data shown in the explorer view 602 by selecting date ranges, type of assist interactions, a view (e.g., explorer 602 or path visualizer 604). A panel 608 displays various statistical information such as number of interactions, number of assist interactions, number of last interactions, as well as a ratio of assist interactions to last interactions. A graph 610 illustrates number of interactions on a periodic basis (e.g., weekly basis). A panel 612 illustrates data associated with a source dimension including a list of sources as well as data for each source including a total number of interactions, a total number of assist interactions, a total number of last interactions, and a ratio of assist interactions to last interactions. Similarly, in FIG. 6B, the panel 612 illustrates data associated with a medium dimension including a list of mediums (e.g., organic, cpc) as well as data for each medium including a total number of interactions, a total number of assist interactions, a total number of last interactions, and a ratio of assist interactions to last interactions.

FIGS. 6C-6J illustrate user interfaces 600c-600j showing a path visualizer view 604, which enables advertisers to dynamically explore conversion paths. The advertisers can dynamically build an analysis sub view path 632 by selecting user interactions preceding and/or following a starting point user interaction 644. The starting point user interaction 644 indicates that the user selected a user interaction with a "source" dimension type and value "google". A dimension type drop down 636 enables the user to select a dimension type in order to segment the user interactions preceding the starting point user interaction 644 as well as user interactions following the starting point user interaction 644. As shown, the user selected "source" dimension type to segment the neighboring user interactions. In other embodiments, two dimension type drop downs or other user interface elements may be provided to allow the advertiser to separately select the dimension for segmenting the user interactions preceding the analysis sub-path 632 and the dimension for segmenting the user interactions following the analysis sub-path 632.

The groups of user interactions 630 preceding the analysis sub-path 632 include all user interactions in conversion paths that precede the starting point user interaction 644. Using elements 648 and 650, the advertisers can select "conversions" or "goal value" to be displayed for each group in the groups of user interactions 630 and 634. As shown, the "conversions" element 648 is selected. Accordingly, each group in the groups of user interactions 630 and 634 shows the total number of conversions that resulted from conversion paths including the user interaction from the group followed by the user interactions in the analysis sub-path. For example, the conversion paths that include the first group of user interactions in which the source dimension has a value "(direct)" followed by user interactions with source dimension with value "google" rendered a total of ninety one conversions.

An example embodiment may include groups of user interactions 630 that are connected to the analysis sub-path 632 with a connector 638. The width and/or height of the connector 638 is scaled to visually represent the number of conversions that followed the particular conversion path. For example, in the groups of user interactions 630, the group with dimension value "(direct)" is connected to the analysis sub-path with a thicker connector than the group with dimension value "(yahoo)".

Figure 6D:
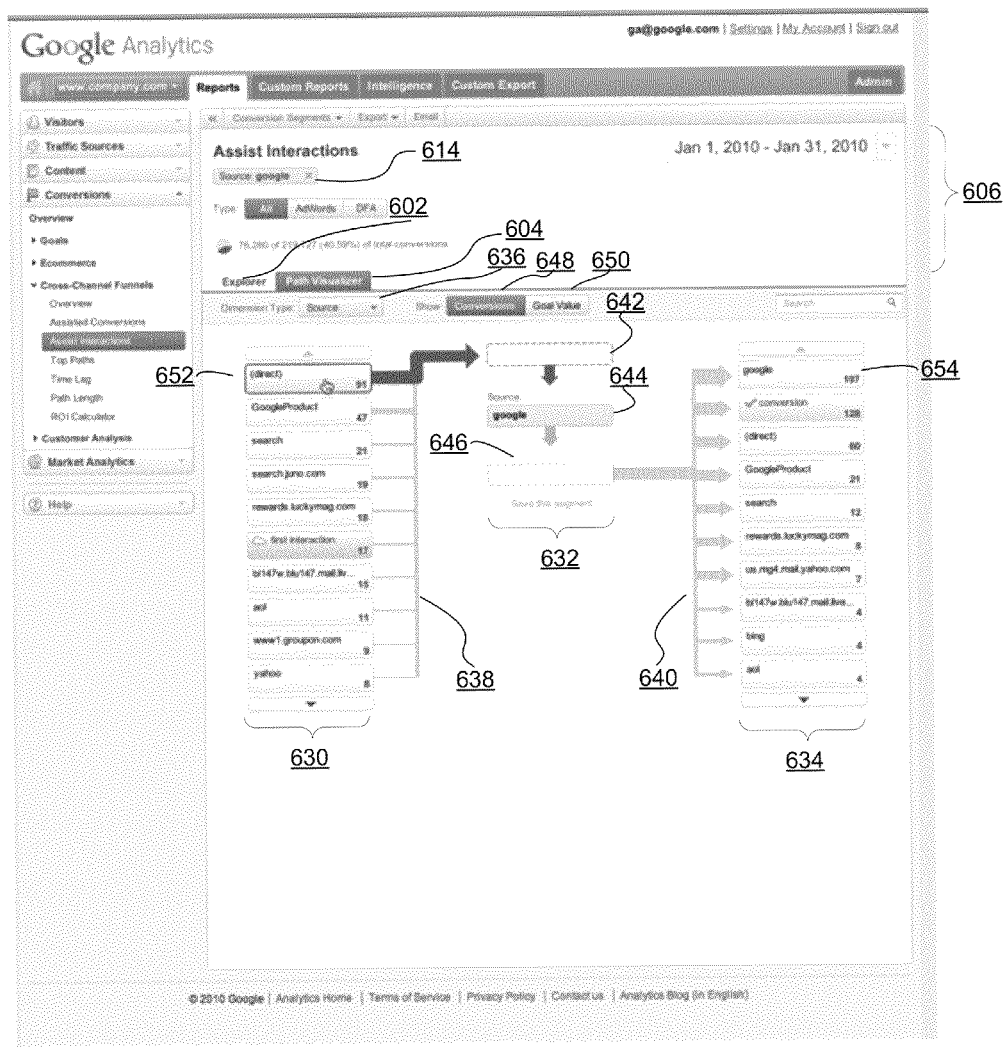

The user can select one or more groups from the groups of user interactions 630 and place the one or more selected groups into the element 642 of the analysis sub-path. For example, as illustrated in FIG. 6D, the advertiser selected a group of user interactions 652 to add to the analysis sub-path 632. As a result, the group of user interactions 652 and its connector to the analysis sub-path 632 are highlighted.

Figure 6E:
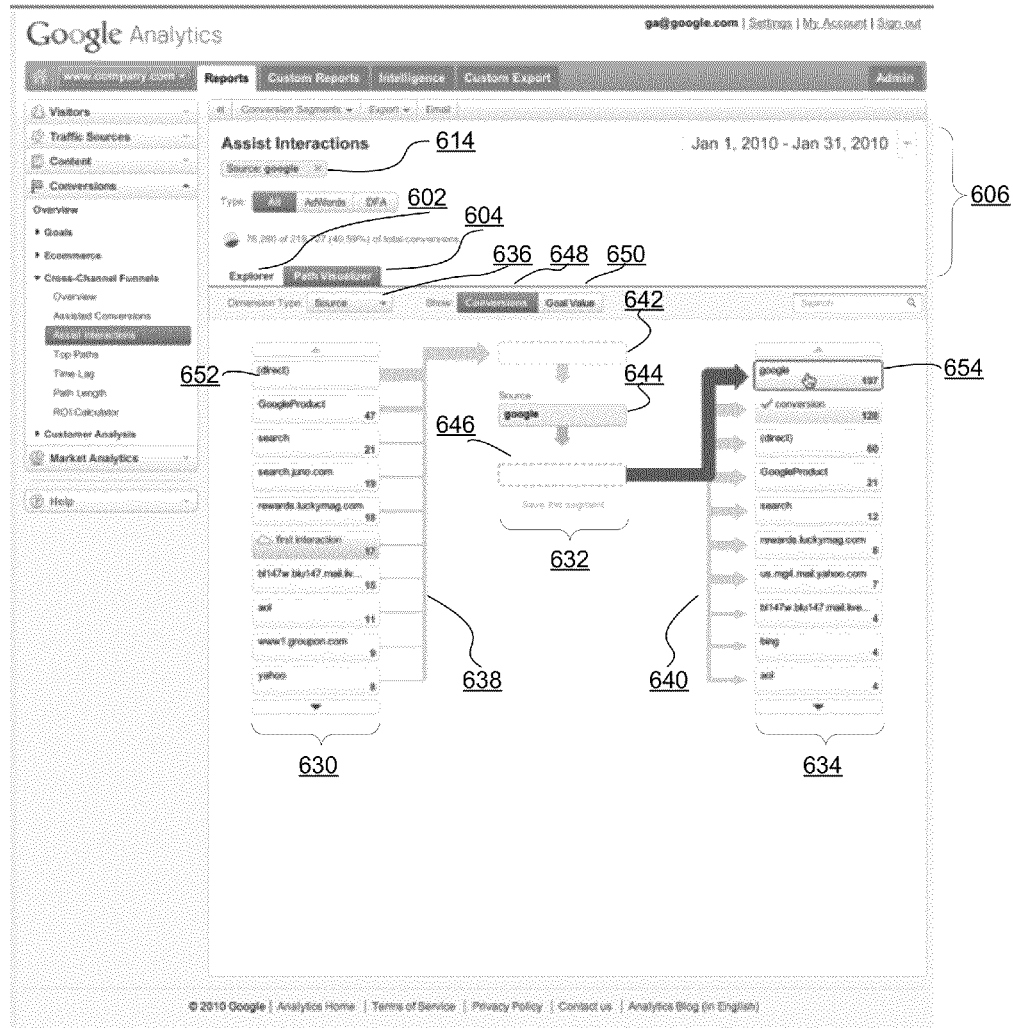
Figure 6F:
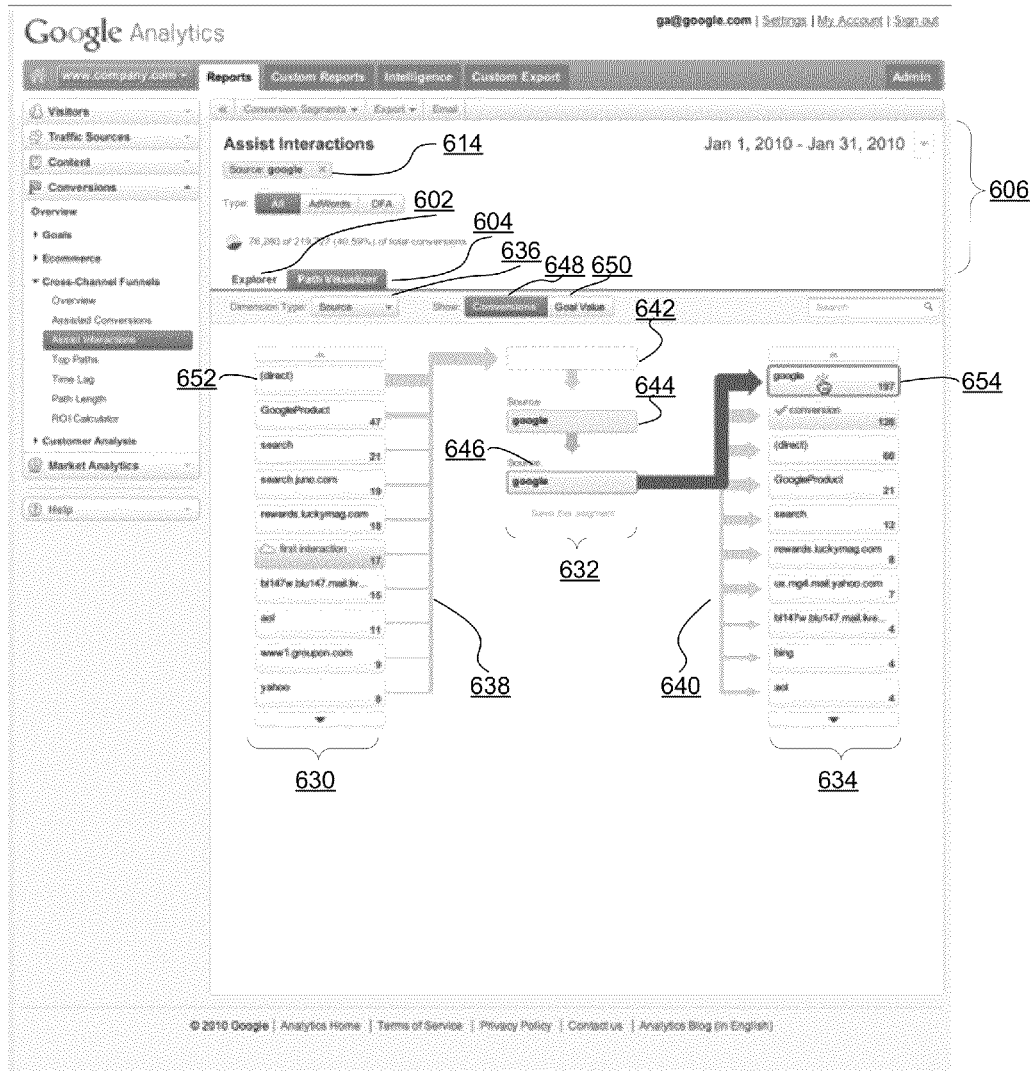
Figure 6G:
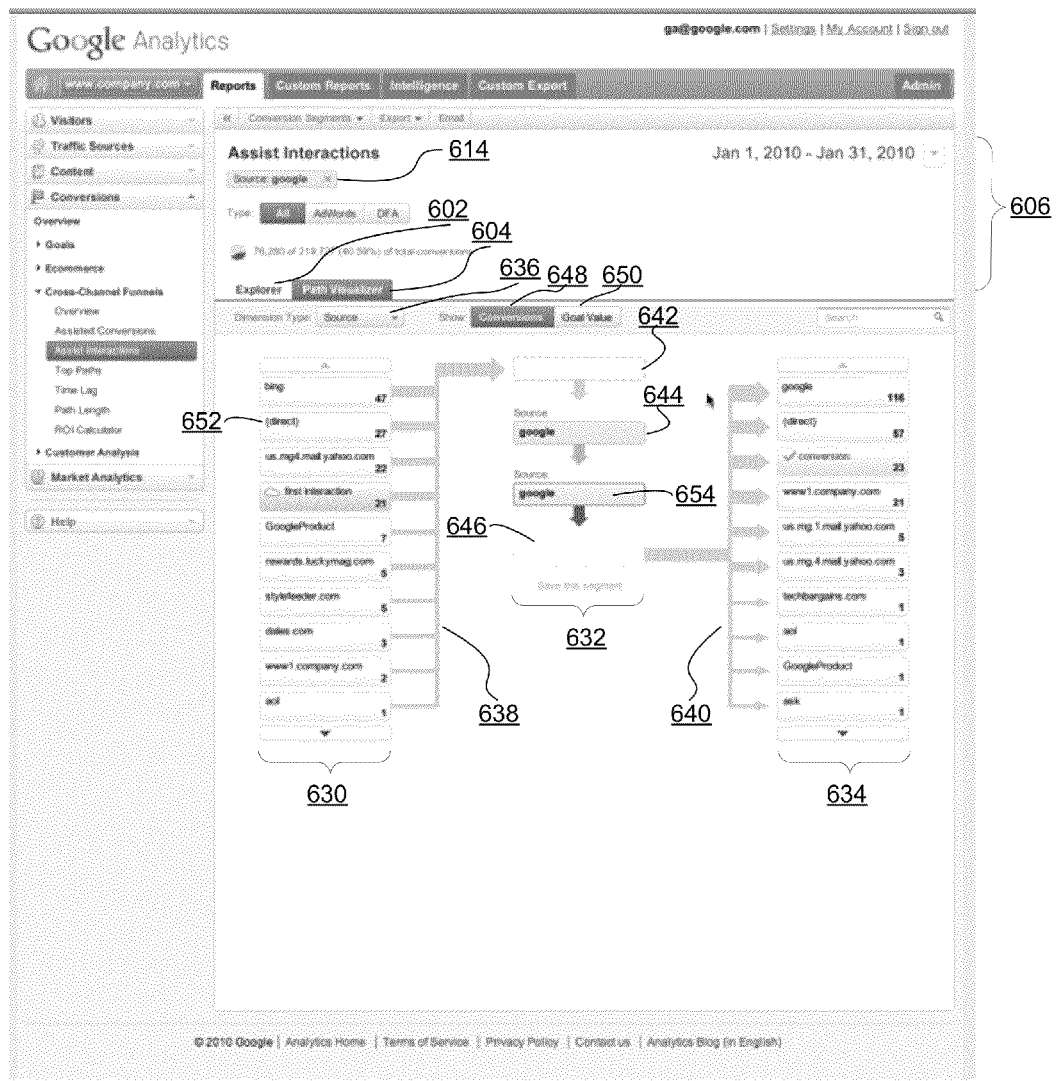

Similarly, the advertiser can select one or more groups from the groups of user interactions 634 and place the one or more selected groups into the element 646 of the analysis sub-path. For example, as illustrated in FIG. 6E, the advertiser selected a group of user interactions 654 to add to the analysis sub-path 632. As a result, the group of user interactions 655 and its connector to the analysis sub-path 632 are highlighted. As further shown in FIG. 6F, the group of user interactions 654 was added to the analysis sub-path 632. Accordingly, the analysis sub-path 632 comprises the user interaction 644 with "source" dimension having value "google" followed by the user interaction 654 with "source" dimension having value "google".

Based on the addition of the user interaction 654 to the analysis sub-path 632, the groups of user interactions 630 and 634 are updated to only show data for user interactions that precede or follow the complete analysis sub-path 632. For example, in the groups of user interactions 630, a group of user interactions with "source" dimension having value "aol" included a total of eleven conversions as shown in FIG. 6F. However, once the user interaction 654 was added to the analysis sub-path 632, the total number of conversions for this group changed to one as shown in FIG. 6G. Accordingly, only one conversion path includes a user interaction having a "source" dimension with value "aol" followed by two "google" searches.

Figure 6H:
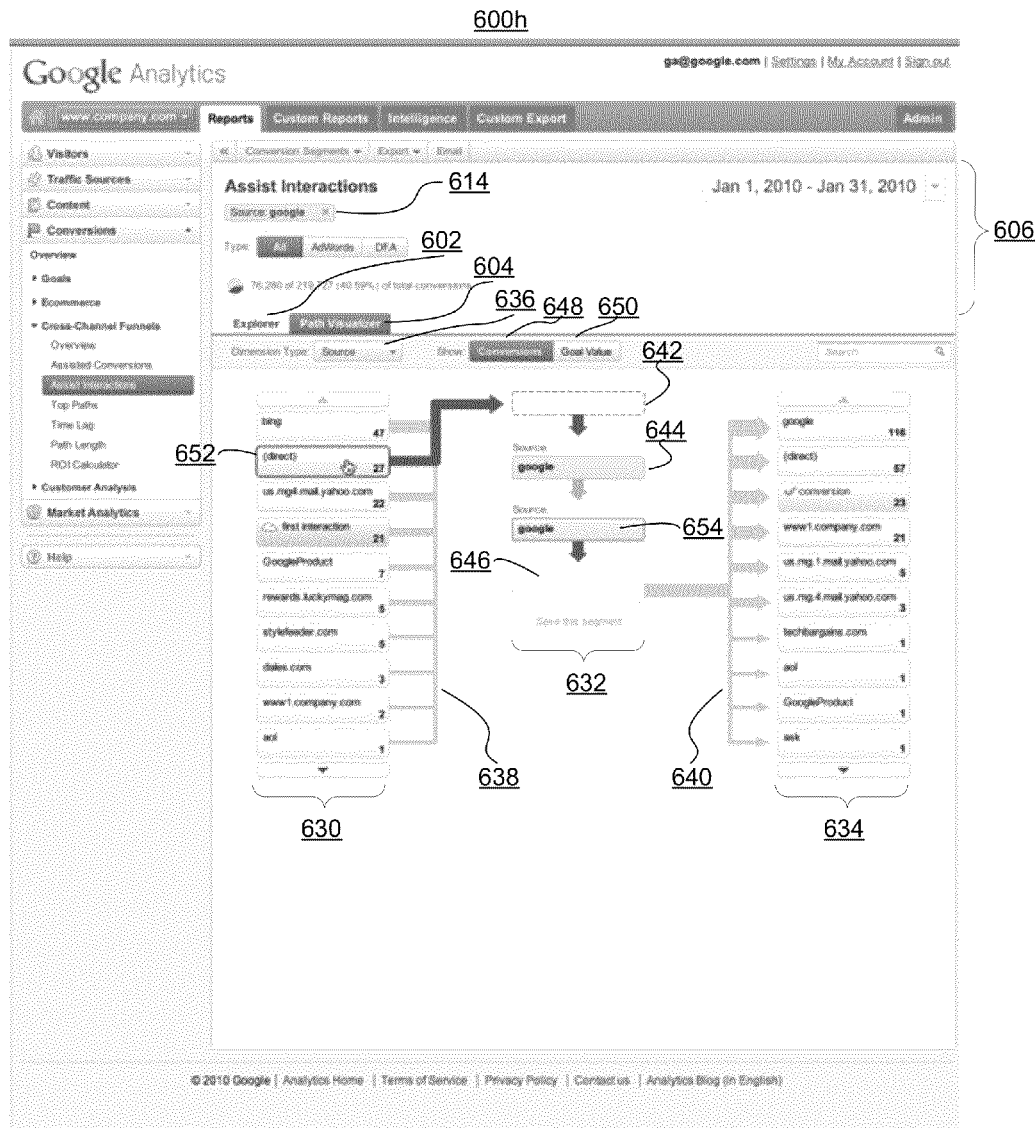
Figure 6I:
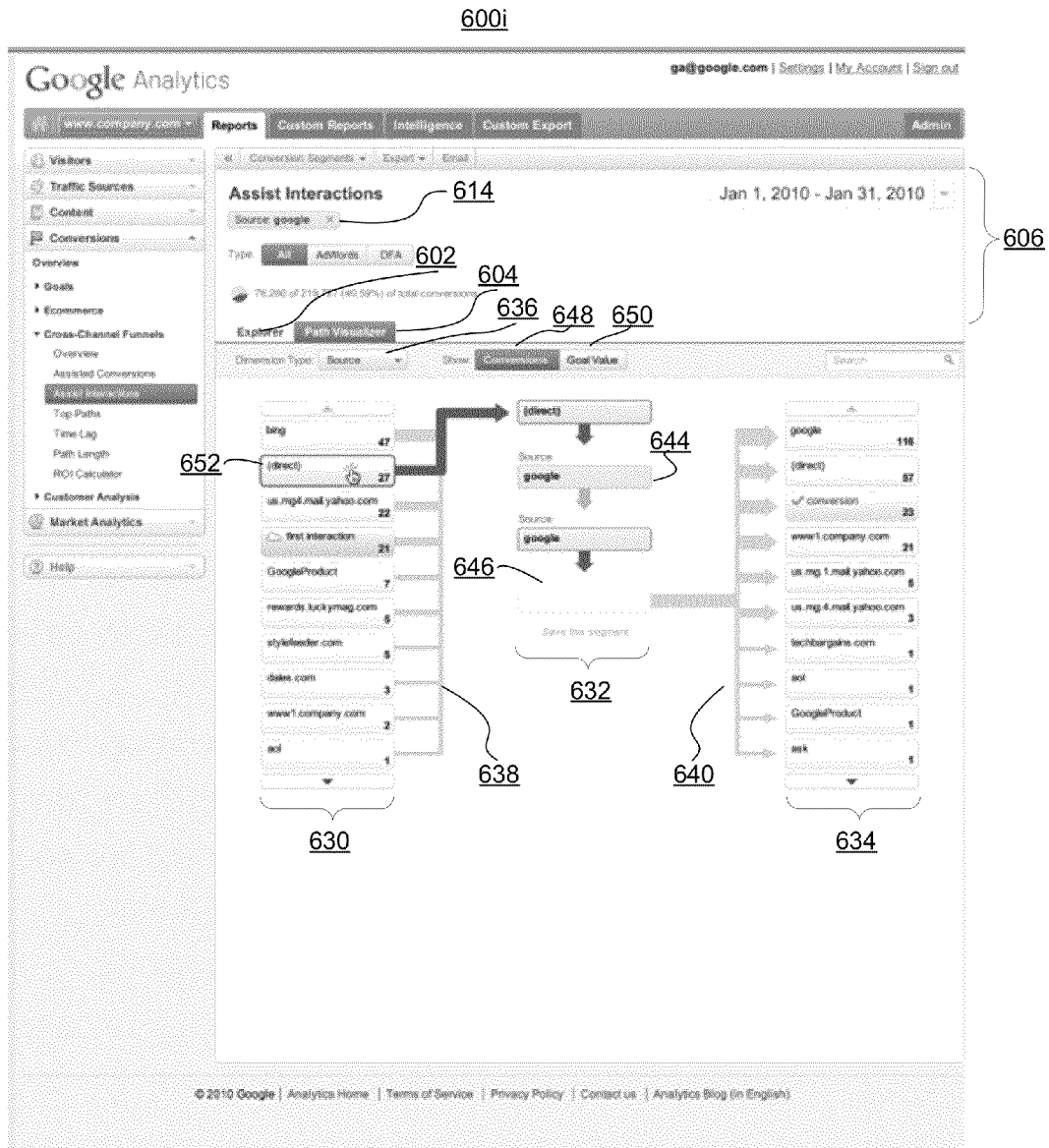
Figure 6J:
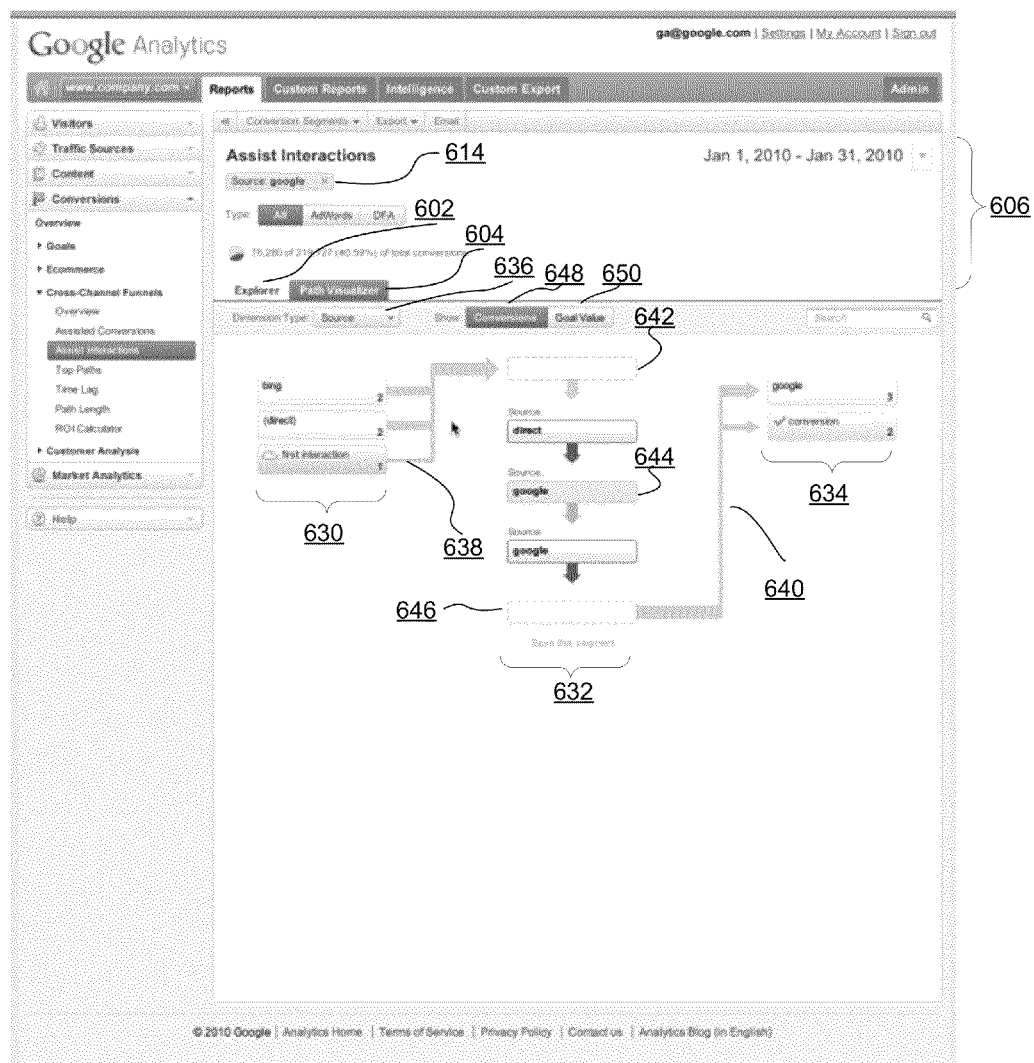

FIGS. 6H-J illustrate adding the group of user interactions 652 to the analysis sub-path 632. The group of user interactions 652 corresponds to user interactions with "source" dimension having value "direct". As shown in FIGS. 6H and 6I, as a result of the advertiser selecting the group of user interactions 652, the group of user interactions 652 and its connector to the analysis sub-path 632 are highlighted. The resulting analysis sub-path 632 includes user interactions with "source" dimension having value "direct" followed by two user interactions with "source" dimension having value "google". The groups of user interactions 630 are updated to show three groups of user interactions while the groups of user interactions 634 are updated to show two groups of user interactions. For example, there were two conversions with conversion paths including a user interaction with "source" dimension having value "bing", followed by a user interaction with "source" dimension having value "direct", followed by two user interactions with "source" dimension having value "google".

As shown in FIG. 6J, the groups of user interactions 630 is shown to include a "first interaction" group with one conversion. When the "first interaction" is added to the analysis sub-path 632, no more user interactions can precede it. Similarly, the groups of user interactions 634 is shown to include a "conversion" group with two conversions. When the "conversion" user interaction is added to the analysis sub-path 632, no more user interactions can follow it.

Figure 7:
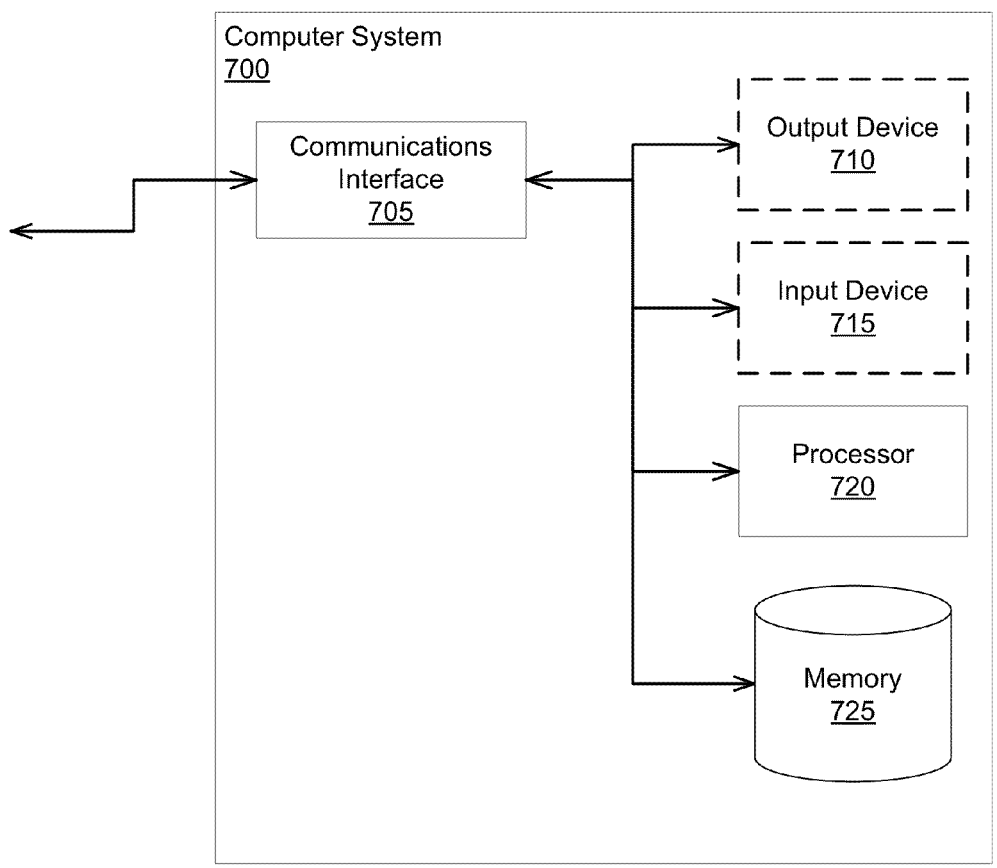
FIG. 7 is a block diagram illustrating a general architecture for a computer system that may be employed to implement various elements of the system shown in FIG. 1, according to an illustrative embodiment.

FIG. 7 shows the general architecture of an illustrative computer system 700 that may be employed to implement any of the computer systems discussed herein (including advertisement management system 110 and user devices 106) in accordance with some embodiments. The computer system 700 can be used to provide user interaction reports, process log files, implement an illustrative performance analysis apparatus 120, implement an illustrative advertisement management system 110, or implement any of the other steps or display/report generation described herein. The computer system 700 of FIG. 7 comprises one or more processors 720 communicatively coupled to memory 704, one or more communications interfaces 706, and optionally one or more output devices 710 (e.g., one or more display units) and one or more input devices 708.

In the computer system 700 of FIG. 7, the memory 704 may comprise any computer-readable storage media, and may store computer instructions (also referred to herein as "processor-executable instructions") for implementing the various functionalities described herein for respective systems, as well as any data relating thereto, generated thereby, and/or received via the communications interface(s) or input device(s) (if present). Referring again to the system 100 of FIG. 1, examples of the memory 704 include the historical data 119 of the advertisement management system. The processor(s) 720 shown in FIG. 7 may be used to execute instructions stored in the memory 704 and, in so doing, also may read from or write to the memory various information processed and or generated pursuant to execution of the instructions.

The processor 720 of the computer system 700 shown in FIG. 7 also may be communicatively coupled to and/or control the communications interface(s) 706 to transmit and/or receive various information pursuant to execution of instructions. In particular, the communications interface(s) 706 may be coupled to a wired or wireless network, bus, or other communication means and may therefore allow the computer system 700 to transmit information to and/or receive information from other devices (e.g., other computer systems). While not shown explicitly in the system of FIG. 1, one or more communications interfaces facilitate information flow between the various elements/subsystems of the environment 100. In some implementations, the communications interface(s) may be configured (e.g., via various hardware components and/or software components) to provide a website as an access portal to at least some aspects of the computer system 700. Examples of communications interfaces 706 include user interfaces (e.g., web pages) accessed by advertisers to track performance of advertisements.

The optional output devices 710 of the computer system 700 shown in FIG. 7 may be provided, for example, to allow various information to be viewed or otherwise perceived in connection with execution of the instructions. The optional input device(s) 708 may be provided, for example, to allow a user to make manual adjustments, make selections, enter data or various other information, and/or interact in any of a variety of manners with the processor during execution of the instructions. Additional information relating to a general computer system architecture that may be employed for various systems discussed herein is provided at the conclusion of this disclosure.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of providing data related to conversion paths, the method comprising:
   receiving information regarding a first plurality of conversion paths, wherein each conversion path comprises one or more user interactions, each user interaction of the one or more user interactions of a conversion path having a corresponding position in the conversion path, wherein each user interaction comprises a plurality of dimensional data related to the user interaction, wherein each conversion path corresponds to a single user, and wherein each conversion path ends with a conversion interaction;
   receiving a first dimension type and a first dimension value for a first filtering user interaction;
   determining a second plurality of conversion paths from the first plurality of conversion paths, each conversion path of the second plurality of conversion paths comprising the first filtering user interaction in the conversion path;
   generating a first set of one or more groups of user interactions from the determined second plurality of conversion paths, each user interaction of the first set of one or more groups corresponding to a user interaction having a corresponding position in the conversion path preceding a corresponding position of the first filtering user interaction in the conversion path, each group of the first set of one or more groups of user interactions grouped based, at least in part, on a second dimension type and a second dimension value;
   generating a second set of one or more groups of user interactions from the determined second plurality of conversion paths, each user interaction of the second set of one or more groups corresponding to a user interaction having a corresponding position in the conversion path subsequent to the corresponding position of first filtering user interaction in the conversion path, each group of the second set of one or more groups of user interactions grouped based, at least in part, on a third dimension type and a third dimension value; and
   providing display data representative of the first filtering user interaction, the first set of one or more of user interactions preceding the first filtering user interaction, and the second set of one or more groups of user interactions subsequent to the first filtering user interaction.

2. The method of claim 1, wherein the first dimension type is a source dimension.

3. The method of claim 1, wherein the first dimension type is a medium dimension.

4. The method of claim 1, wherein the first dimension type is a campaign dimension.

5. The method of claim 1, wherein the first dimension type is a keywords dimension.

6. The method of claim 1, wherein the second dimension type and the third dimension type are the same.

7. The method of claim 1, wherein the second dimension type and the third dimension type are different.

8. The method of claim 1, further comprising:
   receiving a fourth dimension type and a fourth dimension value for a second filtering user interaction in a corresponding position subsequent to the corresponding position of the first filtering user interaction;
   determining a third plurality of conversion paths from the second plurality of conversion paths, each conversion path of the third plurality of conversion paths comprising the first filtering user interaction and the second filtering user interaction, the second filtering user interaction subsequent to the first filtering user interaction;
   generating a third set of one or more groups of user interactions from the determined third plurality of conversion paths, each user interaction of the third set of one or more groups corresponding to a user interaction having a corresponding position in the conversion path preceding the first filtering user interaction and the second filtering user interaction in the conversion path, each group of the third set of one or more groups of user interactions grouped based, at least in part, on a fifth dimension type and a fifth dimension value; and
   generating a fourth set of one or more groups of user interactions from the determined third plurality of conversion paths, each user interaction of the fourth set of one or more groups corresponding to a user interaction having a corresponding position in the conversion path subsequent to the corresponding position of the second filtering user interaction.

9. The method of claim 1 further comprising:
   determining a number of conversions for each group of the first set of one or more groups of user interactions from the determined second plurality of conversion paths;
   wherein providing display data representative of the first set of one or more groups of user interactions preceding the first filtering user interaction includes display data for the determined number of conversions for each group of the first set of one or more groups of user interactions.

10. The method of claim 9, wherein the display data further includes display data for a connector between the first filtering user interaction and a group of the first set of one or more groups of user interactions, the connector having a height dimension representative of the number of conversions for the group of the first set of one or more groups of user interactions.

11. The method of claim 1 further comprising:
   determining a number of conversions for each group of the second set of one or more groups of user interactions from the determined second plurality of conversion paths;
   wherein providing display data representative of the second set of one or more groups of user interactions subsequent to the first filtering user interaction includes display data for the determined number of conversions for each group of the second set of one or more groups of user interactions.

12. The method of claim 11, wherein the display data further includes display data for a connector between the first filtering user interaction and a group of the second set of one or more groups of user interactions, the connector having a height dimension representative of the number of conversions for the group of the second set of one or more groups of user interactions.

13. At least one non-transitory computer readable storage medium encoded with processor-executable instructions that, when executed by at least one processor, perform a method for providing data related to conversion paths, the method comprising:
receiving information regarding a first plurality of conversion paths, wherein each conversion path comprises one or more user interactions, each user interaction of the one or more user interactions of a conversion path having a corresponding position in the conversion path, wherein each user interaction comprises a plurality of dimensional data related to the user interaction, wherein each conversion path corresponds to a single user, and wherein each conversion path ends with a conversion interaction;
receiving a first dimension type and a first dimension value for a first filtering user interaction;
determining from the first plurality of conversion paths a second plurality of conversion paths, each conversion path of the second plurality of conversion paths comprising the first filtering user interaction in the conversion path;
generating a first set of one or more groups of user interactions from the determined second plurality of conversion paths, each user interaction of the first set of one or more groups corresponding to a user interaction having a corresponding position in the conversion path preceding a corresponding position of the first filtering user interaction in the conversion path, each group of the first set of one or more groups of user interactions grouped based, at least in part, on a second dimension type and a second dimension value;
generating a second set of one or more groups of user interactions from the determined second plurality of conversion paths, each user interaction of the second set of one or more groups corresponding to a user interaction having a corresponding position in the conversion path subsequent to the corresponding position of first filtering user interaction in the conversion path, each group of the second set of one or more groups of user interactions grouped based, at least in part, on a third dimension type and a third dimension value; and
providing display data representative of the first filtering user interaction, the first set of one or more groups of user interactions preceding the first filtering user interaction, and the second set of one or more groups of user interactions subsequent to the first filtering user interaction.

14. The non-transitory computer readable storage medium of claim 13, wherein the first dimension type is a source dimension.

15. The non-transitory computer readable storage medium of claim 13, wherein the first dimension type is a medium dimension.

16. The non-transitory computer readable storage medium of claim 13, wherein the first dimension type is a campaign dimension.

17. The non-transitory computer readable storage medium of claim 13, wherein the first dimension type is a keywords dimension.

18. The non-transitory computer readable storage medium of claim 13, wherein the second dimension type and the third dimension type are the same.

19. The non-transitory computer readable storage medium of claim 13, wherein the second dimension type and the third dimension type are different.

20. The non-transitory computer readable storage medium of claim 13, further comprising
receiving a fourth dimension type and a fourth dimension value for a second filtering user interaction in a corresponding position preceding the corresponding position of the first filtering user interaction;
determining a third plurality of conversion paths from the second plurality of conversion paths, each conversion path of the third plurality of conversion paths comprising the first filtering user interaction and the a second filtering user interaction, the second filtering user interaction preceding the first filtering user interaction;
a third set of one or more groups of user interactions from the determined third plurality of conversion paths, each user interaction of the third set of one or more groups corresponding to a user interaction having a corresponding position in the conversion path preceding the second filtering user interaction and the first filtering user interaction in the conversion path, each group of the third set of one or more groups of user interactions grouped based, at least in part, on a fifth dimension type and a fifth dimension value; and
generating a fourth set of one or more groups of user interactions from the determined third plurality of conversion paths, each user interaction of the fourth set of one or more groups corresponding to a user interaction having a corresponding position in the conversion path subsequent to the corresponding position of the first filtering user interaction.

21. The non-transitory computer readable storage medium of claim 13 further comprising:
determining a number of conversions for each group of the first set of one or more groups of user interactions from the determined second plurality of conversion paths;
wherein providing display data representative of the first set of one or more groups of user interactions preceding the first filtering user interaction includes display data for the determined number of conversions for each group of the first set of one or more groups of user interactions.

22. The non-transitory computer readable storage medium of claim 21, wherein the display data further includes display data for a connector between the first filtering user interaction and a group of the first set of one or more groups of user interactions, the connector having a height dimension representative of the number of conversions for the group of the first set of one or more groups of user interactions.

23. The non-transitory computer readable storage medium of claim 13 further comprising:
determining a number of conversions for each group of the second set of one or more groups of user interactions from the determined second plurality of conversion paths;
wherein providing display data representative of the second set of one or more groups of user interactions subsequent to the first filtering user interaction includes display data for the determined number of conversions for each group of the second set of one or more groups of user interactions.

24. The non-transitory computer readable storage medium of claim 23, wherein the display data further includes display data for a connector between the first filtering user interaction and a group of the second set of one or more groups of user interactions, the connector having a height dimension representative of the number of conversions for the group of the second set of one or more groups of user interactions.

25. An apparatus for providing data related to conversion paths, the apparatus comprising:
  at least one communications interface;
  at least one memory to store processor-executable instructions; and
  at least one processor communicatively coupled to the at least one communications interface and the at least one memory, wherein upon execution of the processor-executable instructions, the at least one processor performs operations comprising:
    receiving information regarding a first plurality of conversion paths, wherein each conversion path comprises one or more user interactions, each user interaction of the one or more user interactions of a conversion path having a corresponding position in the conversion path, wherein each user interaction comprises a plurality of dimensional data related to the user interaction, wherein each conversion path corresponds to a single user, and wherein each conversion path ends with a conversion interaction;
    receiving a first dimension type and a first dimension value for a first filtering user interaction;
    determining a second plurality of conversion paths from the first plurality of conversion paths, each conversion path of the second plurality of conversion paths comprising the first filtering user interaction in the conversion path;
    receiving a second dimension type and a third dimension type;
    generating a first set of one or more groups of user interactions from the determined second plurality of conversion paths, each user interaction of the first set of one or more groups corresponding to a user interaction having a corresponding position in the conversion path preceding a corresponding position of the first filtering user interaction in the conversion path, each group of the first set of one or more groups of user interactions grouped based, at least in part, on a second dimension value for the received second dimension type; and
    generating a second set of one or more groups of user interactions from the determined second plurality of conversion paths, each user interaction of the first set of one or more groups corresponding to a user interaction having a corresponding position in the conversion path subsequent to the corresponding position of first filtering user interaction in the conversion path, each group of the second set of one or more groups of user interactions grouped based on a third dimension value for the received third dimension type.

* * * * *